United States Patent
Yamakawa et al.

(10) Patent No.: US 8,729,219 B2
(45) Date of Patent: May 20, 2014

(54) POLYARYLENE BLOCK COPOLYMER HAVING SULFONIC ACID GROUP AND USE THEREOF

(75) Inventors: Yoshitaka Yamakawa, Minato-ku (JP); Toshiaki Kadota, Minato-ku (JP); Takuya Murakami, Minato-ku (JP); Yuuji Tsunoda, Minato-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 13/702,824

(22) PCT Filed: Jun. 8, 2011

(86) PCT No.: PCT/JP2011/063123
§ 371 (c)(1),
(2), (4) Date: Dec. 7, 2012

(87) PCT Pub. No.: WO2011/155520
PCT Pub. Date: Dec. 15, 2011

(65) Prior Publication Data
US 2013/0085236 A1    Apr. 4, 2013

(30) Foreign Application Priority Data
Jun. 10, 2010 (JP) ................................. 2010-133097

(51) Int. Cl.
*C08G 64/00* (2006.01)
(52) U.S. Cl.
USPC ............ 528/370; 528/362; 528/172; 521/180
(58) Field of Classification Search
CPC ................................................ C08G 2261/149
USPC ........................... 528/370, 362, 172; 521/180
See application file for complete search history.

(56) References Cited

U.S. PATENT DOCUMENTS

| | | | |
|---|---|---|---|
| 5,403,675 A | 4/1995 | Ogata et al. | |
| 7,163,988 B2 | 1/2007 | Rozhanskii et al. | |
| 2008/0070085 A1 | 3/2008 | Kanaoka et al. | |
| 2012/0052412 A1 | 3/2012 | Yamakawa et al. | |

FOREIGN PATENT DOCUMENTS

| | | |
|---|---|---|
| JP | 2004-137444 A | 5/2004 |
| JP | 2004-345997 A | 12/2004 |
| JP | 2004-346163 A | 12/2004 |
| JP | 2005-60625 A | 3/2005 |
| JP | 2006-342243 A | 12/2006 |
| JP | 2006-344481 A | 12/2006 |
| JP | 2010-31226 A | 2/2010 |
| WO | WO 2006/048942 A1 | 5/2006 |
| WO | WO 2008/078810 A1 | 7/2008 |

OTHER PUBLICATIONS

International Search Report issued Sep. 20, 2011 in PCT/JP2011/063123.

*Primary Examiner* — Shane Fang
(74) *Attorney, Agent, or Firm* — Oblon, Spivak, McClelland, Maier & Neustadt, L.L.P.

(57) ABSTRACT

A polyarylene block copolymer can provide a solid polymer electrolyte and proton conductive membrane having high proton conductivity, high dimensional stability, and high mechanical strength. The polyarylene block copolymer also has reduced swelling in hot water and reduced shrinkage in drying. The polyarylene block copolymer includes a polymer segment having a sulfonic acid group, and a polymer segment having substantially no sulfonic acid group.

10 Claims, No Drawings

POLYARYLENE BLOCK COPOLYMER HAVING SULFONIC ACID GROUP AND USE THEREOF

TECHNICAL FIELD

The present invention relates to a novel polyarylene block copolymer having a sulfonic acid group, and a solid polymer electrolyte and a proton conductive membrane comprising the polyarylene block copolymer having a sulfonic acid group.

BACKGROUND ART

Electrolyte is usually used in liquid state, such as aqueous electrolyte solutions, but recently the tendency has been increasing to use solid electrolytes. This tendency is firstly because those solid electrolytes have good processability in application in electric and electronic materials, and secondly because of the requirement to overall size and weight reduction and electric power saving.

Inorganic and organic proton conductive materials have been known. As the inorganic materials, hydrates such as uranyl phosphate are used. However, it is difficult that the inorganic materials are enough contacted with substrate or electrode interface. As a result, many problems in forming a conductive layer on a substrate or an electrode are caused.

On the other hand, the organic materials include polymers that belong to cation exchange resins with examples including sulfonated vinyl polymers such as polystyrenesulfonic acid, perfluoroalkylsulfonic acid polymers represented by Nafion (product name; manufactured by DuPont), and perfluoroalkylcarboxylic acid polymers; and organic polymers obtained by introducing sulfonic acid groups or phosphoric acid groups in heat resistant polymers such as polybenzimidazole and polyether ether ketone.

In the manufacturing of fuel cells, an electrolyte membrane of the perfluoroalkylsulfonic acid polymer is sandwiched between electrodes and heat processed by hot pressing or the like to give a membrane-electrode assembly. The fluorine-containing electrolyte membranes are thermally deformed at relatively low temperatures around 80° C. and can be adhered to others easily. However, the temperature can rise to 80° C. or above by reaction heat during operation of the fuel cells. In this case, the electrolyte membrane is easily softened and creeps to cause short circuits between the electrodes, resulting in power generation failure.

To prevent these problems, the thickness of the electrolyte membranes is increased to some degree or fuel cells are designed such that the power generation temperature will not exceed 80° C. Consequently, the maximum output of power generation is limited.

The electrolyte formed from the perfluoroalkylsulfonic acid polymers has poor mechanical characteristics at high temperatures since the polymer has low thermal deformation temperature. To solve the problems, solid polymer electrolyte membranes that have aromatic polymers used in engineering plastics have been developed.

For example, U.S. Pat. No. 5,403,675 (Patent Document 1) discloses solid polymer electrolytes comprising a rigid-rod sulfonated polyphenylene. This polymer contains a main component polymer obtained by polymerizing an aromatic compound composed of phenylene chains, the main component polymer being reacted with a sulfonating agent and thus having a sulfonic acid group introduced thereto. The electrolyte membranes of this polymer have a thermal deformation temperature of 180° C. or above and are excellent in creeping resistance at high temperatures.

However, these electrolyte membranes have large swelling in hot water and large shrinkage in drying, and thus are still insufficient for use in the electrolyte membranes employed for the solid polymer fuel cells.

CITATION LIST

Patent Literatures

Patent Document 1: U.S. Pat. No. 5,403,675

SUMMARY OF INVENTION

Problem to be Solved by the Invention

It is an object of the present invention to provide a polyarylene copolymer having a sulfonic acid group which has high proton conductivity and reduced swelling in hot water and reduced shrinkage in drying. It is another object of the present invention to provide a solid polymer electrolyte and a proton conductive membrane comprising the copolymer.

Mean to Solve the Problem

The present inventors studied diligently to solve the aforementioned problems and have found that the above objects are achieved with a polyarylene that comprises specific structural units. The present invention has been completed based on the finding.

Embodiments of the present invention are indicated in the following [1] to [10].

[1] A polyarylene block copolymer comprising a polymer segment (A) having a sulfonic acid group, and a polymer segment (B) having substantially no sulfonic acid group, the polymer segment (B) having substantially no sulfonic acid group comprising a structural unit represented by the following formula (1).

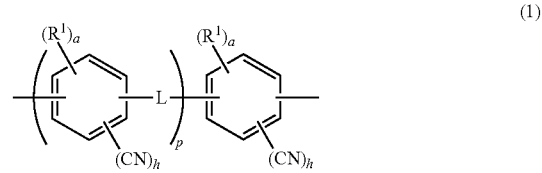

In the formula (1), $R^1$ are each independently a halogen atom, a hydrocarbon group having 1 to 20 carbon atoms, a halogenated hydrocarbon group having 1 to 20 carbon atoms; L is a structural unit represented by the following formula (1-1), or a structural unit represented by the following formula (1-2); at least one of a plurality of L is the structural unit represented by the following formula (1-1); a is an integer of from 0 to 3; p is an integer of from 2 to 200. Note that, a plurality of $R^1$, a, and L may be the same or different. h is an integer of from 1 to "4-a".

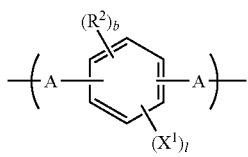
(1-1)

In the formula (1-1), A are each independently —O— or —S—; $R^2$ are each independently a hydrocarbon group having 1 to 20 carbon atoms, or a halogenated hydrocarbon group having 1 to 20 carbon atoms; $X^1$ are each independently a halogen atom; and b is an integer of from 1 to 4, l is an integer from 0 to 3, however, b+l is not greater than 4.

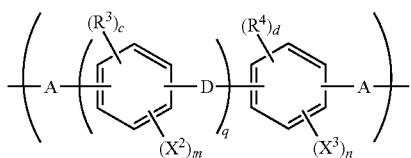
(1-2)

In the formula (1-2), A are each independently —O— or —S—; D is at least one structure selected from the group consisting of a direct bond, —O—, —S—, —CO—, —$SO_2$—, —SO—, —CONH—, —COO—, —$(CF_2)_i$— (i is an integer of from 1 to 10), —$(CH_2)_j$— (j is an integer of from 1 to 10), —$CR'_2$— (R' is an aliphatic hydrocarbon group, an aromatic hydrocarbon group, or a halogenated hydrocarbon group), a cyclohexylidene group, and a fluorenylidene group; $R^3$ and $R^4$ are each independently a hydrocarbon group having 1 to 20 carbon atoms, or a halogenated hydrocarbon group having 1 to 20 carbon atoms; $X^2$ and $X^3$ are each independently a halogen atom; c and d are an integer of from 0 to 4; m and n are an integer of from 0 to 4; and q is an integer of from 0 to 4; however, when q=0, d is 0. Also, c+m and d+n are not greater than 4.

[2] The polyarylene block copolymer of [1], wherein the number average molecular weight in terms of polystyrene of a precursor for deriving the polymer segment (B) having no sulfonic acid group (below formula (1')) is 1,000 to 50,000.

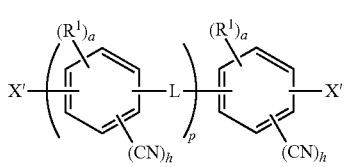
(1')

In the formula (1'), $R^1$, L, a, p and h are defined in the same way as in the formula (1); and X' is an atom or a group selected from a halogen atom, a nitro group, —$SO_2CH_3$, and —$SO_2CF_3$.

[3] The polyarylene block copolymer of [1] or [2], wherein in the formula (1), p is 2 to 150.

[4] The polyarylene block copolymer of [1] to [3], which comprises the structural unit represented by the formula (1-1) and the structural unit represented by the formula (1-2) in a molar ratio (1-1:1-2) of 100:0 to 50:50.

[5] The polyarylene block copolymer of [1] to [4], wherein the structural unit represented by the formula (1-1) comprises the structural unit represented by below formula (1-3) and the structural unit represented by below formula (1-4), in a molar ratio (1-3:1-4) of 10:90 to 90:10;

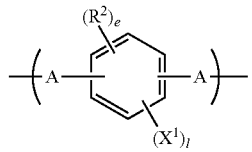
(1-3)

In the formula (1-3), $R^2$, A, $X^1$, and l are defined in the same way as in the formula (1-1); and e is an integer of 1 or 3.

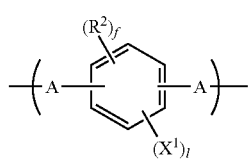
(1-4)

In the formula (1-4), $R^2$, A, $X^1$, and l are defined in the same way as in the formula (1-1); and f is an integer of 2 or 4.

[6] The polyarylene block copolymer of [1] to [4], wherein the polymer segment (A) having a sulfonic acid group comprises a structural unit represented by the following formula (3).

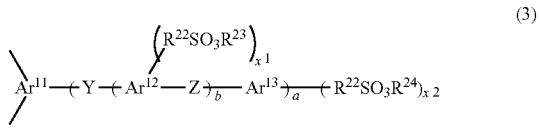
(3)

In the formula, $Ar^{11}$, $Ar^{12}$, and $Ar^{13}$ are each independently a divalent group having at least one structure selected from the group consisting of a benzene ring, a condensed aromatic ring, and a nitrogen-containing heterocyclic ring each of which may be substituted with a fluorine atom; Y is —CO—, —$SO_2$—, —SO—, —CONH—, —COO—, —$(CF_2)_u$— (u is an integer of from 1 to 10), —$C(CF_3)_2$—, or a direct bond; Z is —O—, —S—, a direct bond, —CO—, —$SO_2$—, —SO—, —$(CH_2)_l$— (l is an integer of from 1 to 10), or —$C(CH_3)_2$—; $R^{22}$ is a direct bond, —$O(CH_2)_p$—, —$O(CF_2)_p$—, —$(CF_2)_p$—, or —$(CF_2)_p$— (p is an integer of from 1 to 12). $R^{23}$ and $R^{24}$ are each independently a hydrogen atom, an alkali metal atom, an aliphatic hydrocarbon group, an alicyclic group, or an oxygen-containing heterocyclic group, provided that at least one of all $R^{23}$ and $R^{24}$ contained in the formula is a hydrogen atom.

$x^1$ is an integer of from 0 to 4; $x^2$ is an integer of from 1 to 5; a is an integer of from 0 to 1; and b is an integer of from 0 to 3.

[7] A polymer electrolyte comprising the polyarylene block copolymer of [1] to [6].

[8] A proton conductive membrane comprising the polyarylene block copolymer of [1] to [6].

[9] A membrane electrolyte assembly having a membrane comprising the polymer electrode of [7].

[10] A fuel cell having the proton conductive membrane of [8].

Advantageous Effects of Invention

Since the polyarylene block copolymer having a sulfonic acid group according to the present invention comprises specific structural units, the polyarylene block copolymer has reduced swelling in hot water and reduced shrinkage in drying. Consequently, the introduction of the sulfonic acid group at a high concentration is made possible, and there can be obtained a solid polymer electrolyte and a proton conductive membrane having high proton conductivity, high dimensional stability, and high mechanical strength.

Furthermore, because of reduced swelling in hot water, reduced shrinkage in drying, and excellent heat resistance and durability, the polyarylene copolymer having a sulfonic acid group according to the present invention can be preferably used for a proton conductive membrane for a fuel cell.

DESCRIPTION OF EMBODIMENTS

Hereinafter, a polyarylene copolymer, a solid polymer electrolyte, and a proton conductive membrane according to the present invention will be described in detail.

[Polyarylene Copolymer]

The polyarylene copolymer of the present invention comprises a polymer segment (A) having a sulfonic acid group and a polymer segment (B) having substantially no sulfonic acid group. The structure of copolymer is not particularly limited provided that the copolymer has these segments, and may be a random copolymer, a block copolymer, or a mixture of these. In the present invention, block copolymer is particularly preferable.

[Polymer Segment Having Substantially No Sulfonic Acid Group]

The polymer segment (B) having substantially no sulfonic acid group comprises a structural unit represented by the following formula (1).

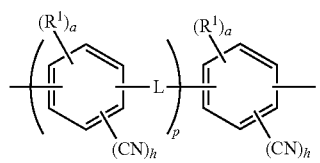

(1)

In the formula (1), $R^1$ are each independently a halogen atom, a hydrocarbon group having 1 to 20 carbon atoms, a halogenated hydrocarbon group having 1 to 20 carbon atoms; L is a structural unit represented by the following formula (1-1), or a structural unit represented by the following formula (1-2); at least one of a plurality of L is the structural unit represented by the following formula (1-1); a is an integer of from 0 to 3; p is an integer of from 2 to 200; h is an integer of from 1 to "4-a". Note that, a plurality of $R^1$, a, and L may be the same or different.

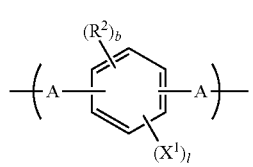

(1-1)

In the formula (1-1), A are each independently —O— or —S—; $R^2$ are each independently a hydrocarbon group having 1 to 20 carbon atoms, or a halogenated hydrocarbon group having 1 to 20 carbon atoms; $X^1$ are each independently a halogen atom; and b is an integer of from 1 to 4, l is an integer of from 0 to 3.

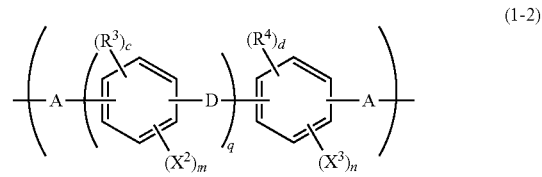

(1-2)

In the formula (1-2), A are each independently —O— or —S—; D is at least one structure selected from the group consisting of a direct bond, —O—, —S—, —CO—, —SO$_2$—, —SO—, —CONH—, —COO—, —(CF$_2$)$_i$— (i is an integer of from 1 to 10), —(CH$_2$)$_j$— (j is an integer of from 1 to 10), —CR'$_2$— (R' is an aliphatic hydrocarbon group, an alicyclic aromatic hydrocarbon group, aromatic hydrocarbon group, or a halogenated hydrocarbon group), a cyclohexylidene group, and a fluorenylidene group; $R^3$ and $R^4$ are each independently a hydrocarbon group having 1 to 20 carbon atoms, or a halogenated hydrocarbon group having 1 to 20 carbon atoms; $X^2$ and $X^3$ are each independently a halogen atom; c and d are an integer of from 0 to 4; m and n are an integer of from 0 to 4; and q is an integer of from 0 to 4. However, when q=0, d is 0. Also, c+m and d+n are not greater than 4.

Examples of a monovalent hydrocarbon group having 1 to 20 carbon atoms in the above $R^1$ to $R^4$ include an alkyl group having 1 to 20 carbon atoms such as a methyl group, an ethyl group, a propyl group, an isopropyl group, a butyl group, an isobutyl group, a t-butyl group, a tetramethyl butyl group, an amyl group, a pentyl group, and a hexyl group; a cycloalkyl group having 3 to 20 carbon atoms such as a cyclopentyl group, and a cyclohexyl group; an aromatic hydrocarbon group having 6 to 20 carbon atoms such as a phenyl group, a naphthyl group, and a biphenyl group; and an alkenyl group having 2 to 20 carbon atoms such as a vinyl group, and allyl group.

Examples of the monovalent halogenated hydrocarbon group having 1 to 20 carbon atoms in the above $R^1$ to $R^4$ include a halogenated alkyl group having 1 to 20 carbon atoms, a halogenated cycloalkyl group having 3 to 20 carbon atoms, and a halogenated aromatic hydrocarbon group having 6 to 20 carbon atoms. Examples of the halogenated alkyl group include a trichloromethyl group, a trifluoromethyl group, a tribromomethyl group, a pentachloroethyl group, a pentafluoroethyl group, and a pentabromoethyl group. Examples of the halogenated aromatic hydrocarbon group include a chlorophenyl group, and a chloronaphthyl group.

Note that, a plurality of $R^3$, c, m, $X^2$, $R^4$, and $X^3$ may be the same or different. When a plurality of $R^1$ to $R^4$ is present, the $R^1$ to $R^4$ may be the same or different, respectively.

Groups having branched structures are preferable as $R^2$, and when branched alkyl groups, such as tert-butyl group, tetramethylbutyl group, and tert-amyl group, are introduced, productivity of polymer and film-forming properties when producing the film can be enhanced.

a is preferably 0 or 1, more preferably 0.
b is preferably 1 to 3, more preferably 1 or 2.
c is preferably 0 or 1, more preferably 0.
d is preferably 0 or 1, more preferably 0.
A is preferably —O—.
p is preferably 2 to 150, more preferably 3 to 125, further preferably 5 to 100.

The polyarylene block copolymer according to the present invention has CN groups introduced in the main chain, and includes a polymer segment having a structural unit represented by the formula (1) as an essential component.

By such a polymer segment, block copolymer having reduced swelling in hot water and reduced shrinkage in drying can be produced while suppressing segmental motions of the molecular chain in the polymer main chain.

q is preferably 1 or 2, more preferably 1.

The structural unit represented by the formula (1-1) and the structural unit represented by the formula (1-2) are contained preferably in a molar ratio (1-1:1-2) of 100:0 to 50:50, more preferably in a molar ratio of 100:0 to 75:25.

By including structural unit represented by the formula (1-1) in this ratio, swelling and shrinkage caused by heating and cooling can be reduced, and block copolymer having reduced swelling in hot water and reduced shrinkage in drying can be produced.

Furthermore, the structural unit represented by the formula (1-1) contains the structural unit represented by below formula (1-3) and the structural unit represented by below formula (1-4), and the molar ratio of (1-3) to (1-4) is preferably 10:90 to 90:10, more preferably 20:80 to 80:20.

By including structural units represented by the formulae (1-3) and (1-4) in this ratio, film having reduced swelling in hot water and reduced shrinkage in drying can be produced without impairing productivity of polymer and film-forming properties of the film. Although the reason is not clear, in case where polymer segment (B) is obtained by either one of the formula (1-3) or the formula (1-4), while interaction between polymer segments (B) is increased due to a certain tacticity, there is a problem that solubility in solvents reduces, polymer solution concentration for cast film-forming reduces, smooth film cannot be obtained, and thus film-forming properties reduces. On the other hand, in case where polymer segment (B) is obtained by a combination of the structural units represented by the formulae (1-3) and (1-4), the tacticity in the polymer segment (B) is reduced, solubility in solvents for cast film-forming increases, and film-forming properties increases. At this time, it is thought that the swelling in hot water is not reduced since the structural units represented by the formulae (1-3) and (1-4) are formed by alkyl side chains or perfluoroalkyl side chains having high hydrophobicities.

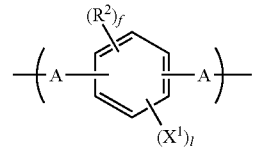
(1-4)

In the formula (1-4), $R^2$, A, $X^1$, and l are defined in the same way as in the formula (1-1); and f is an integer of 2 or 4.

It is preferable to use a combination of structural units that have the different numbers of substituents in $R^2$ because the tacticity in the polymer segment (B) is reduced, and solubility in solvents for film-forming varnish increases.

The number average molecular weight in terms of polystyrene of a precursor for introducing the polymer segment (B) (represented by formula (1') below) having substantially no sulfonic acid group is 1,000 to 50,000, more preferably 2,000 to 30,000, still more preferably 3,000 to 20,000.

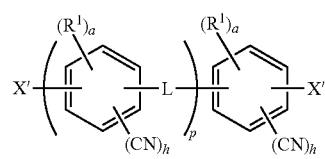
(1')

In the formula (1'), $R^1$, L, a, p and h are defined in the same way as in the formula (1); and X' is an atom or a group selected from a halogen atom, a nitro group, $-SO_2CH_3$, and $-SO_2CF_3$.

Moreover, as long as the object of the present invention is not impaired, arbitrary segments may be contained. For example, a segment formed from a structural unit represented by the following formula may be contained.

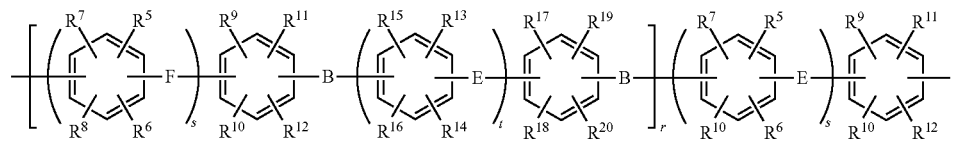
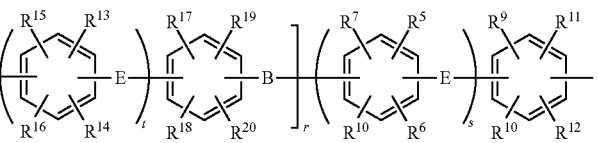

In the formula, E and F are independently at least one structure selected from the group consisting of a direct bond, $-CO-$, $-SO_2-$, $-SO-$, $-CONH-$, $-COO-$, $-(CF_2)_l-$ (l is an integer of 1 to 10), $-(CH_2)_l-$ (l is an integer of 1 to 10), $-CR'_2-$ (R' is an aliphatic hydrocarbon group, an aromatic hydrocarbon group, or a halogenated hydrocarbon group), a cyclohexylidene group, a fluorenylidene group, $-O-$ and $-S-$; B are independently an oxygen atom, or a sulfur atom; $R^5$ to $R^{21}$ may be the same as or different from each other, and are at least one atom or group selected from a hydrogen atom, a fluorine atom, an alkyl group, a partially halogenated or wholly halogenated alkyl group, an allyl group, an aryl group, and a nitro group. s and t are an integer of from 0 to 4; r is an integer of 0, or 1 or more.

[Structural Unit Having Sulfonic Acid Group]

The polymer segment (A) having a sulfonic acid group, although not limited particularly, preferably comprises a structural unit represented by the following formula (3).

This ratio can be adjusted by adjusting a ratio of compounds represented by formulae (1-6) and (1-7) during preparation of the compound (A) which constitutes the structural unit of the polymer segment having substantially no sulfonic acid, described hereinafter.

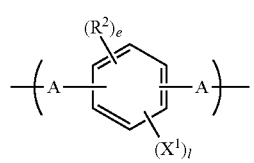
(1-3)

In the formula (1-3), $R^2$, A, $X^1$, and l are defined in the same way as in the formula (1-1); and e is an integer of 1 or 3.

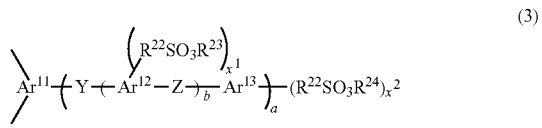
(3)

In the formula (3), $Ar^{11}$, $Ar^{12}$ and $Ar^{13}$ are each independently a divalent group having at least one structure selected from the group consisting of a benzene ring, a condensed aromatic ring, and a nitrogen-containing heterocyclic ring each of which may be substituted with a fluorine atom.

Y is —CO—, —CONH—, —COO—, —$SO_2$—, —SO—, —$(CF_2)_u$— (u is an integer of from 1 to 10), —$C(CF_3)_2$—, or a direct bond.

Z is —O—, —S—, a direct bond, —CO—, —$SO_2$—, —SO—, —$(CH_2)_l$— (l is an integer of from 1 to 10), or $C(CH_3)_2$—.

$R^{22}$ is a direct bond, —$O(CH_2)_p$—, —$O(CF_2)_p$—, —$(CH_2)_p$—, or —$(CF_2)_p$— (p is an integer of from 1 to 12).

$R^{23}$ and $R^{24}$ are each independently a hydrogen atom, an alkali metal atom, or an aliphatic hydrocarbon group, provided that at least one of all $R^{23}$ and $R^{24}$ contained in the formula is a hydrogen atom.

$x^1$ is an integer of from 0 to 4; $x^2$ is an integer of from 1 to 5; a is an integer of from 0 to 1; and b is an integer of from 0 to 3.

The structural unit having a sulfonic acid group preferably comprises a repeating unit represented by the following formula (3-1).

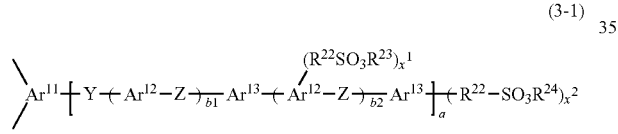
(3-1)

In the above formula, $Ar^{11}$, $Ar^{12}$ and $Ar^{13}$ are each independently at least one structure selected from the group consisting of an aromatic ring such as a benzene ring and a naphthalene ring, and a nitrogen-containing heterocyclic ring each of which may be substituted with a fluorine atom.

Y is at least one structure selected from the group consisting of —CO—, —CONH—, —COO—, —$SO_2$—, —SO—, —$(CF_2)_u$— (u is an integer of from 1 to 10), —$C(CF_3)_2$—, and a direct bond.

Z is at least one structure selected from the group consisting of —O—, —S—, a direct bond, —CO—, —$SO_2$—, —SO—, —$(CH_2)_l$— (l is an integer of from 1 to 10), and —$C(CH_3)_2$—.

$R^{22}$ is at least one structure selected from the group consisting of a direct bond, —$O(CH_2)_p$—, —$O(CF_2)_p$—, —$(CH_2)_p$—, and —$(CF_2)_p$— (p is an integer of from 1 to 12).

$R^{23}$ and $R^{24}$ are each independently at least one structure selected from the group consisting of a hydrogen atom, an alkali metal atom, and an aliphatic hydrocarbon group, provided that at least one of all $R^{23}$ and $R^{24}$ contained in the formula is a hydrogen atom.

$x^1$ is an integer of from 0 to 4; $x^2$ is an integer of from 1 to 5; a is an integer of from 0 to 1; and b1 and b2 are each an integer of from 0 to 3.

The repeating unit represented by the formula (3) or the formula (3-1) is preferably a structure represented by the following formula (3-2).

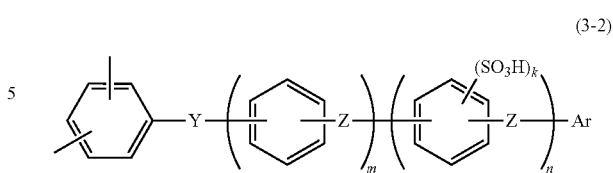
(3-2)

In the formula (3-2), Y is at least one structure selected from the group consisting of —CO—, —$SO_2$—, —SO—, a direct bond, —$(CF_2)_u$— (u is an integer of from 1 to 10), and —$C(CF_3)_2$—.

Z is at least one structure selected from the group consisting of a direct bond, —$(CH_2)_l$— (l is an integer of from 1 to 10), —$C(CH_3)_2$—, —O—, —S—, —CO—, and —$SO_2$—.

Ar is an aromatic group having a substituent represented by —$SO_3H$, —$O(CH_2)_p SO_3H$ or —$O(CF_2)_p SO_3H$. p is an integer of from 1 to 12, m is an integer of from 0 to 3, n is an integer of from 0 to 3, and k is an integer of from 1 to 4. Of single lines at ends of the structural unit, a single line one side of which does not show a substituent represents a bond with a neighboring structural unit. When m and n are each 2 or more, a plurality of Z and k may be the same or different, respectively, and a binding position is not particularly limited. Examples of the aromatic group include a phenyl group and a naphthyl group.

Specific structures of the structural unit having a sulfonic acid group are, for example, as follows.

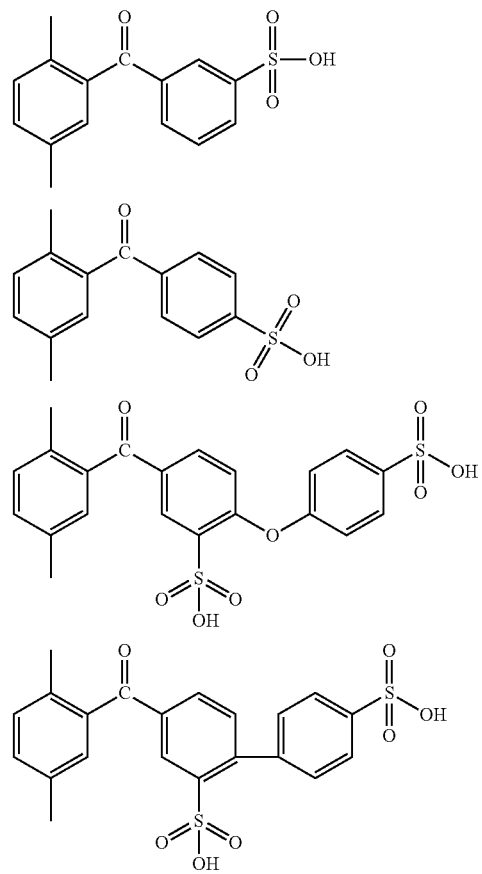

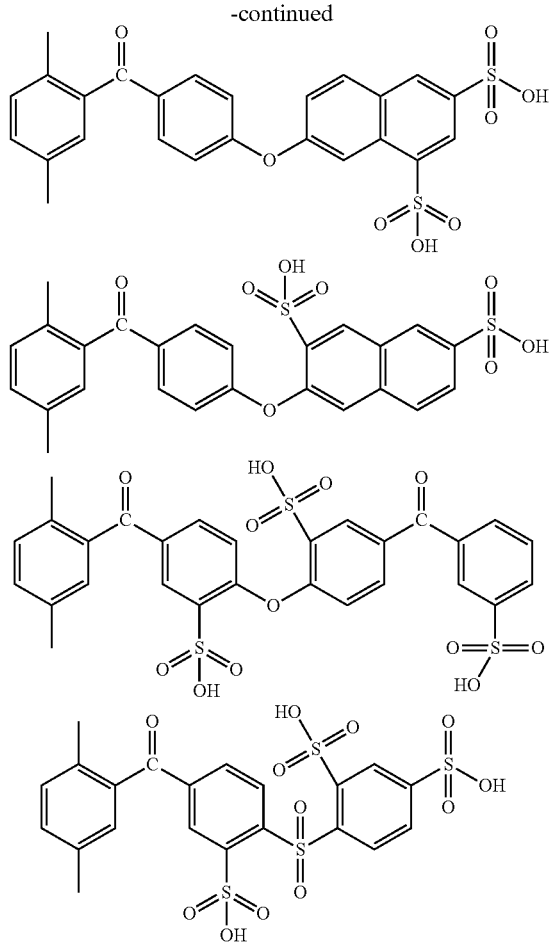

In the present invention, the structural unit may have a phosphonic acid group together with the sulfonic acid group.

[Structural Unit Having Nitrogen-Containing Heterocyclic Group]

In the present invention, the structural unit having a nitrogen-containing heterocyclic group may be contained. The nitrogen-containing heterocyclic group has the structure represented by the following formula (4-1).

$$—(R^s)_e—(V—R^h)_f \qquad (4\text{-}1)$$

In the formula, V is not particularly limited as long as being a divalent organic group, but is preferably at least one structure selected from the group consisting of —O—, —S—, a direct bond, —CO—, —SO$_2$— and —SO—.

$R^s$ is a direct bond, or a given divalent organic group which is not particularly limited. The divalent organic group is any of the hydrocarbon group having 1 to 20 carbon atoms, with specific examples including an alkylene group such as a methylene group, and an ethylene group, an aromatic ring such as a phenylene group, a condensed aromatic ring, and a nitrogen-containing heterocylic ring. $R^s$ may be a group represented by —W—$Ar^9$—.

In the above formula, $Ar^9$ is a divalent group having at least one structure selected from the group consisting of a benzene ring, a condensed aromatic ring, and a nitrogen-containing heterocyclic ring each of which may be substituted with a fluorine atom.

W is at least one structure selected from the group consisting of —CO—, —SO$_2$—, —SO—, —(CF$_2$)$_u$— (u is an integer of from 1 to 10), —C(CF$_3$)$_2$—, and a direct bond.

e is an integer of from 0 to 4, and f is integer of from 1 to 5.

The aromatic ring of the main chain and the electron withdrawing group V are preferably directly bonded to each other in terms of safety, but may be bonded to each other via a divalent group, i.e., $R^s$, as long as the effect of the present invention is not impaired.

Specific examples of the structure having a nitrogen-containing heterocyclic group represented by the formula (4-1) include structures represented by the following formulae (4-2).

$$—V—R^h \qquad (4\text{-}2a)$$

$$—R^s—V—R^h \qquad (4\text{-}2b)$$

$R^h$ is a nitrogen-containing heterocyclic group, with examples including a nitrogen-containing five-membered ring or six-membered ring structure. The number of the nitrogen atoms in the heterocyclic ring is not particularly limited as long as being one or more. The heterocyclic ring may contain oxygen or sulfur in addition to nitrogen.

The nitrogen-containing heterocyclic group, constituting $R^h$, is a group formed by abstracting a hydrogen atom bonded to carbon or nitrogen from a nitrogen-containing heterocyclic compound or a derivative thereof, wherein the nitrogen-containing heterocyclic compound includes pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline and quinazoline.

The nitrogen-containing heterocyclic groups thereof may have substituents. Examples of the substituents include alkyl groups such as a methyl group, an ethyl group, and a propyl group, aryl groups such as a phenyl group, a tolyl group, and a naphthyl group, a cyano group and a fluorine atom.

The structural unit having a nitrogen-containing heterocyclic group, contained in the copolymer of the present invention, is represented by the following formula (5).

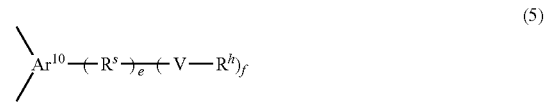

(5)

In the formula (5), $Ar^{10}$ is a trivalent group having at least one structure selected from the group consisting of a benzene ring, a condensed aromatic ring, and a nitrogen-containing heterocyclic ring. In $Ar^{10}$, a part of or all of the hydrogen atoms may be substituted with at least one atom or group selected from the group consisting of a fluorine atom, a nitro group, and a nitrile group; or a part of or all of the hydrogen atoms may be substituted with at least one atom or group selected from the group consisting of an alkyl group, an allyl group, and an aryl group each of which may be substituted with fluorine.

In the formula (5), V, e, f, $R^s$, and $R^h$ are defined in the same way as in the formulae (4-1) and (4-2).

The structure having the nitrogen-containing heterocyclic group preferably has a structure represented by the following formula (6), in the polyarylene block copolymer of the present invention.

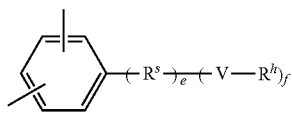
(6)

In the formula (6), V, $R^s$, and $R^h$ are defined in the same way as in the formula (5). Of single lines at ends of the structural unit, a single line one side of which does not show a substituent represents a bond with a neighboring structural unit.

In the formula (6), the nitrogen-containing heterocyclic group $R^h$ is preferably a pyridine ring. The pyridine ring, among the nitrogen-containing heterocyclic rings, originally has a lower basicity of N, and thus shows a feature of improving the proton conductivity in low-humidity region.

In the formula (6), V is preferably —CO—, or —SO$_2$—. —CO—, if combined with the pyridine ring, easily forms a thermally stable structure as a result of stabilization due to conjugation. —SO$_2$-decreases electron density and more inhibits the basicity of nitrogen, which can increase proton conductivity particularly in low-humidity region.

e and f are defined in the same way as in the formulae (4-1) and (4-2).

By including the structural unit having a nitrogen-containing heterocyclic group as described above, a solid polymer electrolyte membrane is obtained which is provided with basicity and has highly stabilized sulfonic acid under high temperature without the proton conductivity being impaired.

The polyarylene block copolymer according to the present invention has its individual structural units determined in accordance with desired properties such as the ion exchange capacity and the molecular weight.

In order to have reduced swelling in hot water and shrinkage in drying, 1 mol of the total amounts of all the segments of the block copolymer of the present invention comprises the polymer segment (B) having substantially no sulfonic acid group in an amount of 0.001 to 0.9 mol, preferably 0.003 to 0.8 mol, more preferably 0.005 to 0.6 mol.

Swelling/shrinkage of the polyarylene block copolymer according to the present invention is preferably not more than 20%.

Note that, as described in the below Examples, the swelling/shrinkage is calculated from a swelling percentage and a shrinkage percentage by subjecting a film formed of polyarylene block copolymer to hot water experiment.

The inclusion of the polymer segment (B) enables the introduction of the sulfonic acid group at a high concentration. The amount of the polymer segment (A) having a sulfonic group is appropriately determined in accordance with the ion exchange capacity.

The structural unit having a nitrogen-containing heterocyclic group, if contained, is not particularly limited on its amount, but the structural unit having a nitrogen-containing heterocyclic group is desirably contained in amount of not more than 0.5 mol, preferably not more than 0.3 mol, more preferably not more than 0.1 mol, based on 1 mol of the total amounts of all the segments.

The molecular weight of the polymer of the present invention is 10,000 to 1,000,000, preferably 20,000 to 800,000, more preferably 50,000 to 300,000, as the weight average molecular weight in terms of polystyrene determined by gel permeation chromatography (GPC).

The ion exchange capacity of the polymer according to the present invention is usually 0.3 to 6 meq/g, preferably 0.5 to 4 meq/g, and more preferably 0.8 to 3.5 meq/g. When the ion exchange capacity is within the above range, proton conductivity is high and power generation performance is high, and water resistance is sufficiently high.

The above ion exchange capacity can be adjusted by varying the types, usage ratios and combination of the individual structural units. Thus, such adjustments of the ion exchange capacity can be made during polymerization by varying the ratios of charging amounts and the types of precursors (monomers and oligomers) for introducing the structural units.

In general, more amount of the structural unit having a sulfonic acid group or a phosphonic acid group increases the ion exchange capacity and proton conductivity, but tends to decrease water resistance. On the other hand, less amount of such a structural unit decreases the ion exchange capacity and increases water resistance, but tends to decrease proton conductivity. More amount of the phosphonic acid group tends to increase radical resistance.

[Process for Producing Polyarylene Copolymer]

The polyarylene copolymer of the present invention can be produced by, for example, Method A1 or Method B1, shown below.

(Method A1)

For example, similarly to a method disclosed in JP-A-2004-137444, the polymer may be synthesized by copolymerizing a compound (A) which will form the structural unit of the polymer segment having substantially no sulfonic acid, a sulfonate (B) which will form the structural unit of the polymer segment having a sulfonic acid, and optionally a compound (C) which will form the structural unit of the polymer segment having a nitrogen-containing heterocyclic group, and by converting the sulfonate group into the sulfonic acid group.

(Compound (A) which will form the structural unit of the polymer segment having substantially no sulfonic acid (hereinafter, also called a "compound (A)").)

The polymer segment having substantially no sulfonic acid is a polymerization material for the polyarylene copolymer, and can be introduced thereto by using a compound represented by the following formula (1-5).

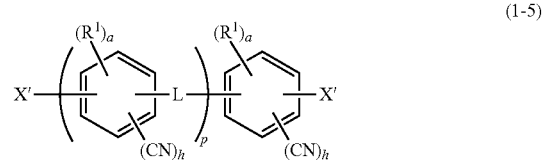
(1-5)

In the formula (1-5), $R^1$, L, a, p and h are defined in the same way as in the formula (1); and X' is an atom or a group selected from a halogen atom, a nitro group, —SO$_2$CH$_3$, and —SO$_2$CF$_3$.

The compound represented by the formula (1-5) can be produced through a reaction shown below, for example.

At first, bis(thio)phenols represented by the following formula (1-6), and optionally bis(thio) phenols represented by the following formula (1-7) are converted into alkali metal salts.

At this time, the bisphenols are dissolved in a polar solvent of high dielectric constant such as N-methyl-2-pyrrolidone, N,N-dimethylacetamide, sulfolane, diphenylsulfone or dimethyl sulfoxide. Then, into the solution, an alkali metal (such as lithium, sodium, and potassium), an alkali metal hydride, an alkali metal hydroxide, an alkali metal carbonate and the like are added. The alkali metal is used in slight excess over the hydroxyl groups of the phenols, for example 1.1 to 2 times, preferably 1.2 to 1.5 times the equivalent weight of the hydroxyl groups. Here, it is preferable that the reaction is accelerated by using a solvent that forms an azeotropic mixture with water, such as benzene, toluene, xylene, chlorobenzene and anisole.

Subsequently, the alkali metal salts of the above bisphenols or bis(thio)phenols are reacted with dihalide compounds represented by the following formula (1-8).

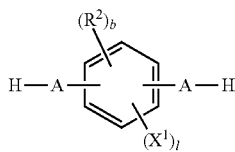
(1-6)

In the formula (1-6), $R^2$, A, l, $X^1$ and b are defined in the same way as in the formula (1-1).

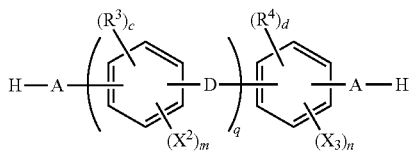
(1-7)

In the formula (1-7), $R^3$, $R^4$, $X^2$, $X^3$, A, D, b, and q are defined in the same way as in the formula (1-2).

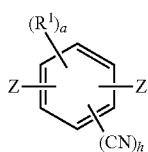
(1-8)

In the formula (1-8), $R^1$, a, and h, are defined in the same way as in the formula (1); and Z is an atom or a group selected from a halogen atom, a nitro group, $-SO_2CH_3$, and $-SO_2CF_3$. Examples of the bis(thio)phenols represented by the formula (1-6) include 2-methylhydroquinone, 2,3-dimethylhydroquinone, 2-tert-butylhydroquinone, 2,5-di-1,1,3,3-tetramethylbutylhydroquinone, 2,5-di-tert-amylhydroquinone, 2,5-di-tert-butylhydroquinone and these groups in which an OH group is substituted by a SH group. These bis(thio)phenols may be used singly or in combination of two or more kinds.

Examples of the bis(thio)phenols represented by the formula (1-7) include 1,3-bis[1-methyl-1-(4-hydroxyphenyl)ethyl]benzene (Bis-M), 1,4-bis[1-methyl-1-(4-hydroxyphenyl)ethyl]benzene, 1,3-(4-hydroxybenzoylbenzene), 1,4-(4-hydroxybenzoylbenzene), 1,3-bis(4-hydroxyphenoxy)benzene, 1,4-bis(4-hydroxyphenoxy)benzene, 1,4-bis(4-hydroxyphenyl)benzene, 1,3-bis(4-hydroxyphenyl)benzene, 4,4'-isopropylidenebisphenol (Bis-A), 2,2-bis(4-hydroxyphenyl)-1,1,1,3,3,3-hexafluoropropane (Bis-AF), 4,4'-bishydroxybenzophenone (4,4'-DHBP), 4,4'-bishydroxydiphenylsulfone (4,4'-DHDS), 4,4'-dihydroxydiphenylether, 4,4'-dihydroxybiphenyl (4,4'-DHBP), bis(4-hydroxyphenyl)methane, resorcinol (RES), hydroquinone (HQ), 9,9-bis(4-hydroxyphenyl)fluorene (BPFL), 9,9-bis(4-hydroxy-3-methylphenyl)fluorene (BCFL), 4,4'-isopropylidenebis(2-phenylphenol), and 4,4'-cyclohexylidene bis(2-cyclohexylphenol). Of these, 1,3-bis[1-methyl-1-(4-hydroxyphenyl)ethyl]benzene (Bis-M), 1,4-bis[1-methyl-1-(4-hydroxyphenyl)ethyl]benzene, 2,2-bis(4-hydroxyphenyl)-1,1,1,3,3,3-hexafluoropropane (Bis-AF), resorcinol (RES), and 9,9-bis(4-hydroxyphenyl)fluorene (BPFL) are preferable. These bis(thio)phenols may be used singly or in combination of two or more kinds.

Examples of compounds represented by the formula (1-8) include, for example, 2,6-dinitrobenzonitrile, 2,5-dinitrobenzonitrile, 2,4-dinitrobenzonitrile, 2,6-dichlorobenzonitrile (2,6-DCBN), 2,5-dichlorobenzonitrile (2,5-DCBN), 2,4-dichlorobenzonitrile (2,4-DBCN), 2,6-difluorobenzonitrile (2,6-DFBN), 2,5-difluorobenzonitrile (2,5-DFBN), 2,4-difluorobenzonitrile (2,4-DFBN). These compounds may be used singly or in combination of two or more kinds.

(Sulfonate (B) which will form the structural unit of the polymer segment having a sulfonic acid group (hereinafter, also called as "compound (B)").)

The compound (B) is a monomer having a sulfonic acid group, and is represented by the following formula (16).

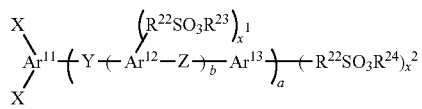
(16)

Notations in the formula (16) are defined in the same way as in the formula (3). $Ar^{11}$, $Ar^{12}$ and $Ar^{13}$ may be the same or different, and are at least one structure selected from the group consisting of a benzene ring, a condensed aromatic ring (e.g. a naphthalene ring), and a nitrogen-containing heterocyclic ring each of which may be substituted with a fluorine atom.

X is at least one structure selected from the group consisting of chlorine, bromine, iodine, a methanesulfonyl group, a trifluoromethanesulfonyl group, a benzenesulfonyl group, and a toluenesulfonyl group. Y is at least one structure selected from the group consisting of —CO—, —CONH—, —COO—, —SO$_2$—, —SO—, —(CF$_2$)$_l$— (l is an integer of from 1 to 10), —C(CF$_3$)$_2$—, and a direct bond. Z is at least one structure selected from the group consisting of —O—, —S—, a direct bond, —CO—, —SO$_2$—, —SO—, —(CH$_2$)$_l$— (l is an integer of from 1 to 10), and —C(CH$_3$)$_2$—. $R^{22}$ is at least one structure selected from the group consisting of a direct bond, —O(CH$_2$)$_p$—, —O(CF$_2$)$_p$—, —(CH$_2$)$_p$—, and —(CF$_2$)$_p$— (p is an integer of from 1 to 12).

$R^{23}$ and $R^{24}$ are at least one structure selected from the group consisting of a hydrogen atom, an alkali metal atom, an aliphatic hydrocarbon group, an alicyclic hydrocarbon group, a hydrocarbon group containing a heterocyclic ring containing an oxygen as a hetero atom.

$x^1$ is an integer of from 0 to 4; $x^2$ is an integer of from 1 to 5; a is an integer of from 0 to 1; and b is an integer of from 0 to 3.

When a is 2 or more, a plurality of Y, Z, b, $x^1$, $Ar^{12}$, $Ar^{13}$, $R^{23}$, and $R^{24}$ may be the same or different, respectively.

The monomer represented by the formula (16) preferably comprises a structure represented by the following formula (17).

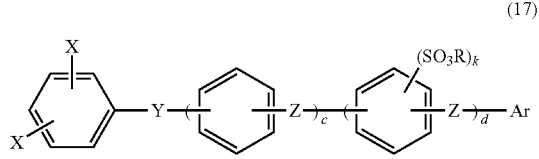

(17)

In the formula (17), X is an atom or a group selected from the group consisting of a chlorine atom, a bromine atom, and —OSO$_2$Rb (here, Rb is an alkyl group, a fluorine-substituted alkyl group, or an aryl group).

Y, Z, and k are defined in the same way as in the formula (16).

c is an integer of from 0 to 10, preferably from 0 to 2; d is an integer of from 0 to 10, preferably 0 to 2; and k is an integer of from 1 to 4. When c and d are each 2 or more, a plurality of Z, R, and k may be the same or different, respectively.

Ar is an aromatic group having a substituent represented by —SO$_3$R, —O(CH$_2$)$_h$SO$_3$R, or —O(CF$_2$)$_h$SO$_3$R (h is an integer of from 1 to 12). R is a branched or linear alkyl group, a cycloalkyl group, or a heterocyclic group containing oxygen as a hetero atom, with the number of carbon atoms being preferably 4 to 20. R may be partially substituted with a hydrogen atom.

Specific examples of the compound represented by the formula (17) include compounds represented by the following formulae, and sulfonates described in JP-A-2004-137444, JP-A-2004-345997, and JP-A-2004-346163.

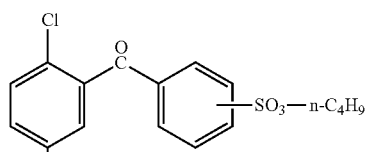
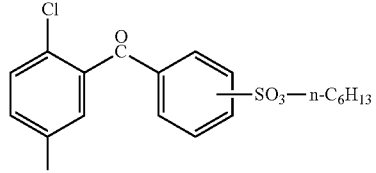
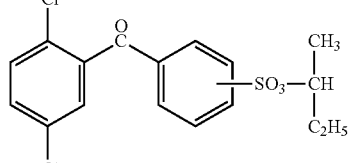
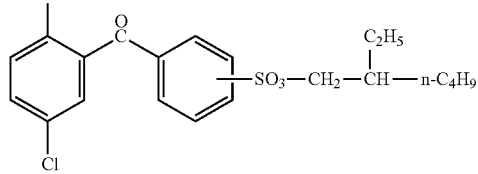
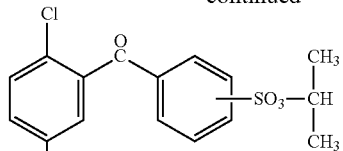
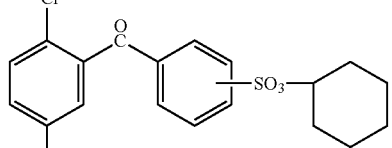
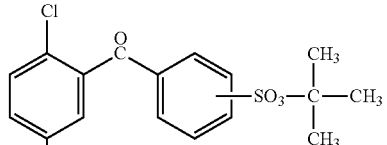
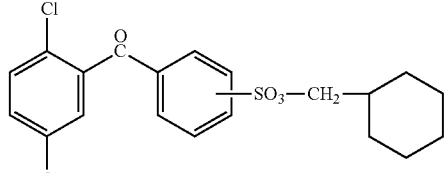
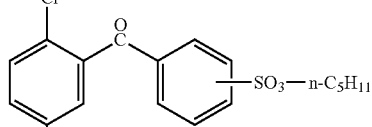
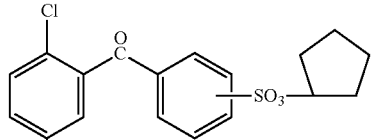
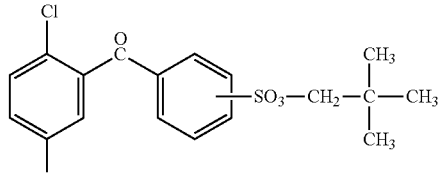
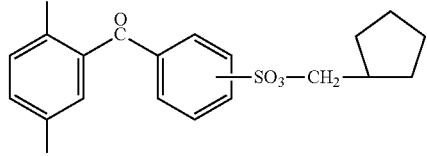
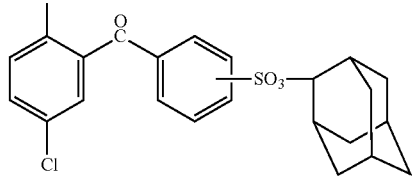

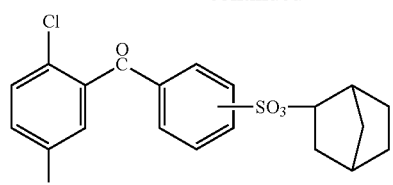
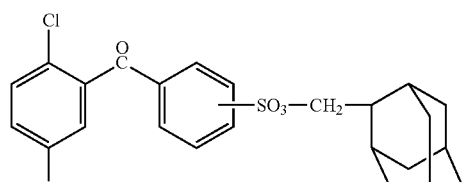
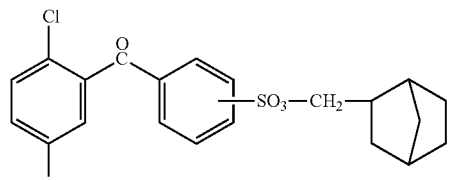
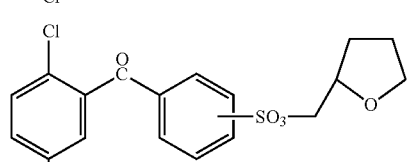
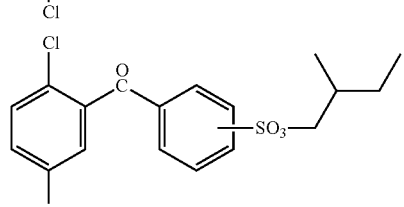
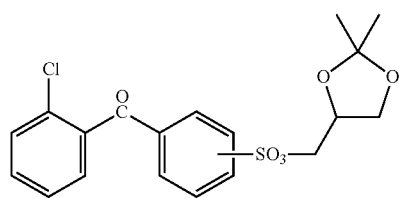
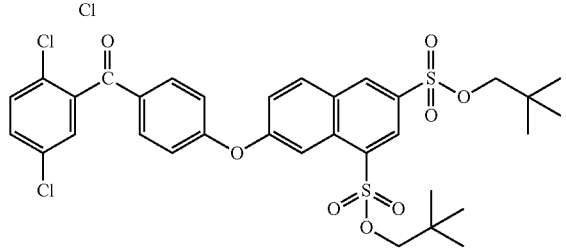
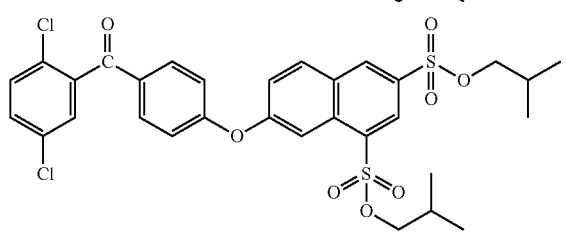
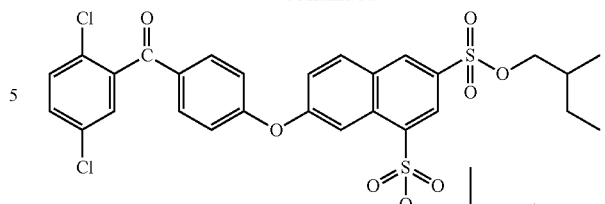
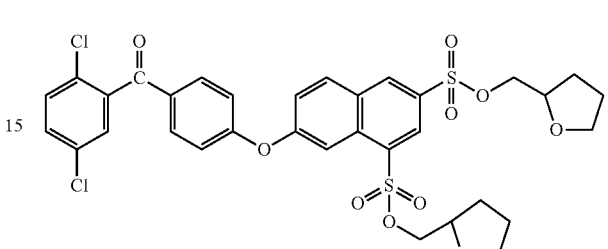
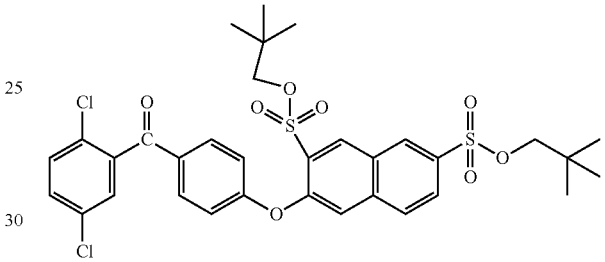
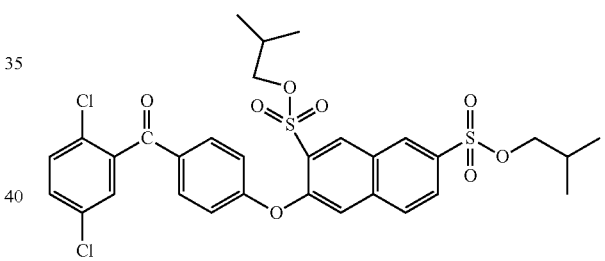
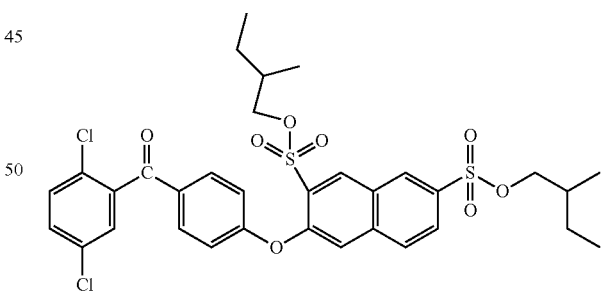
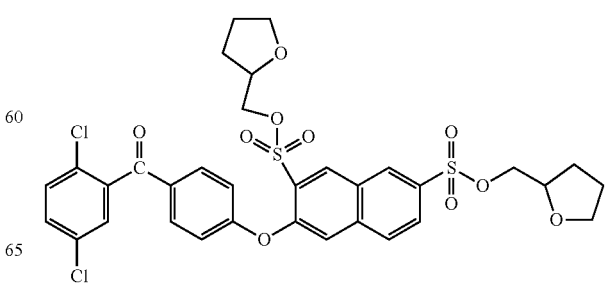

-continued
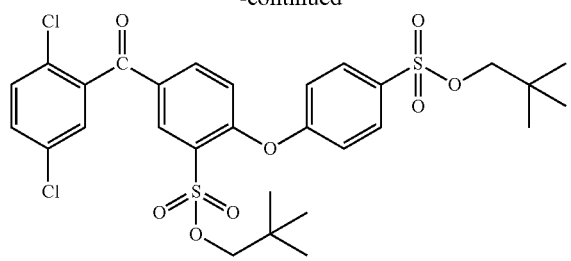
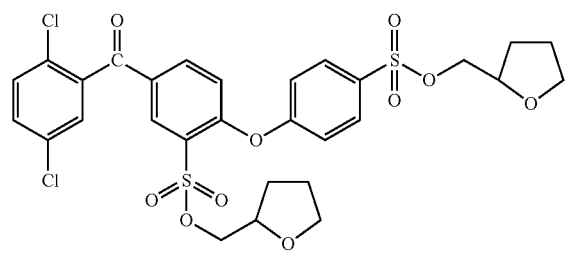
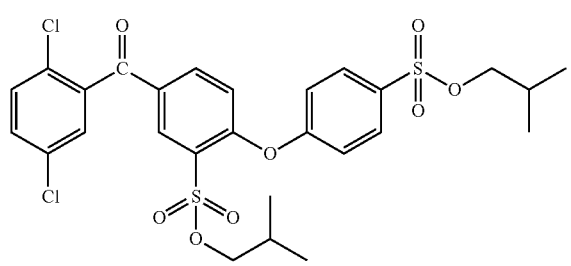
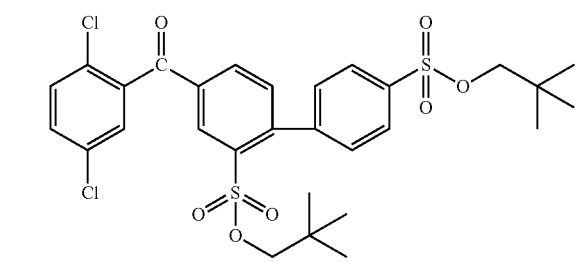
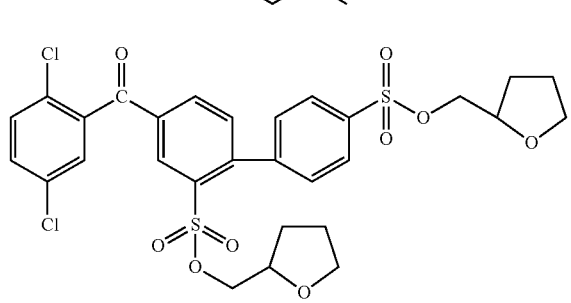
-continued
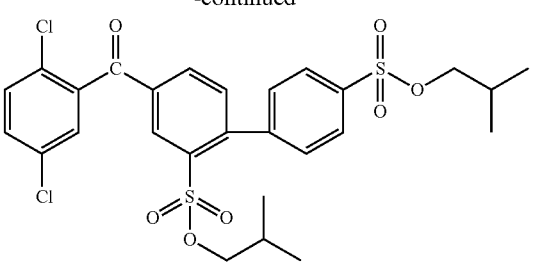
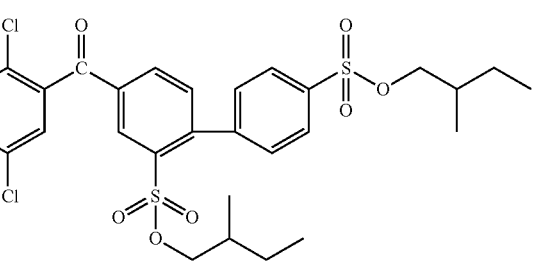
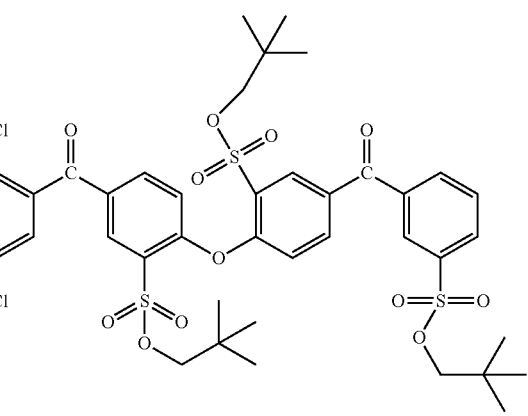
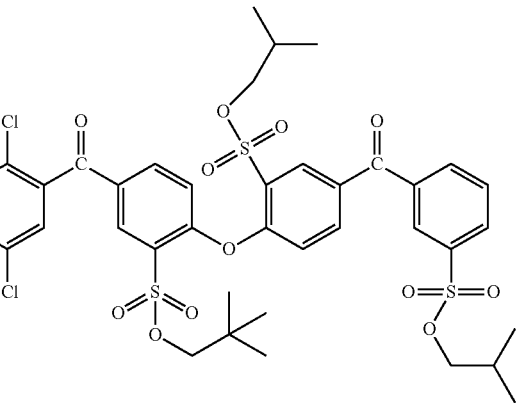

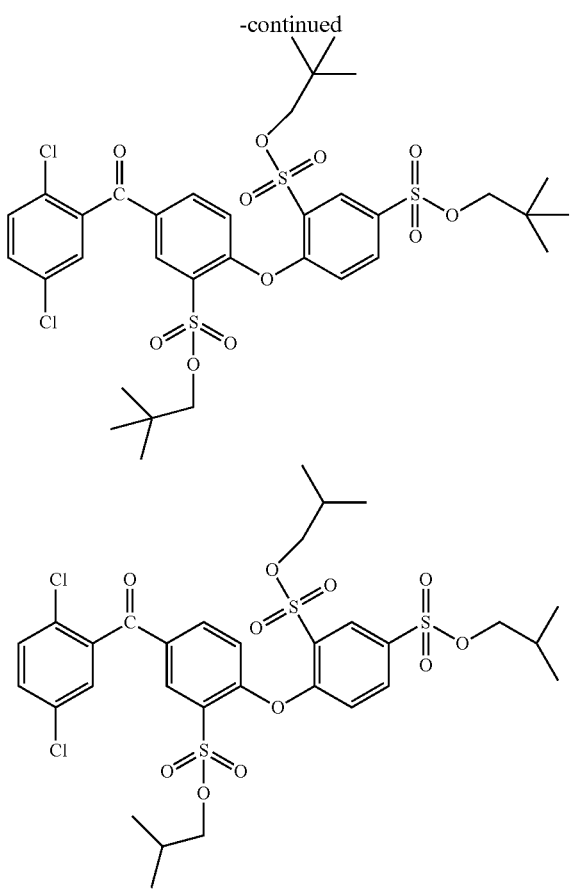

In the compound represented by the formula (17), binding position of the sulfonate structure is not particularly limited to the positions in the above examples.

(Compound (C) which will form the structural unit having a nitrogen-containing heterocyclic group (hereinafter, also called a "compound (C)".)

The compound (C) is a monomer having a nitrogen-containing heterocyclic structure, and is represented by the following formula (24).

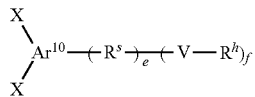

(24)

$Ar^{10}$, V, e, f, $R^s$, and $R^h$ are defined in the same way as in the formulae (4-1), (4-2), and (5).

Additionally, X is defined in the same way as in the formula (16).

The above is specifically represented by the following formula (25).

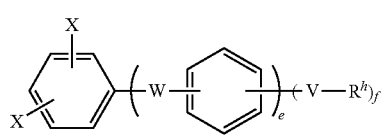

(25)

W, V, $R_h$, e, and f are defined in the same way as in the formulae (4-1), (4-2), and (5). Additionally, X is defined in the same way as in the formula (16).

Specific examples of the compound (C) include the following compounds.

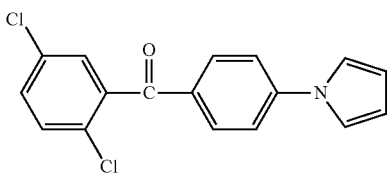

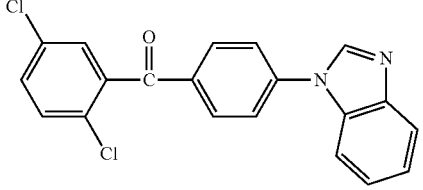

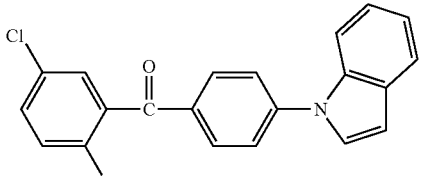

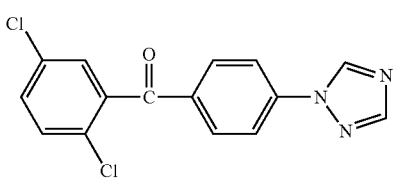

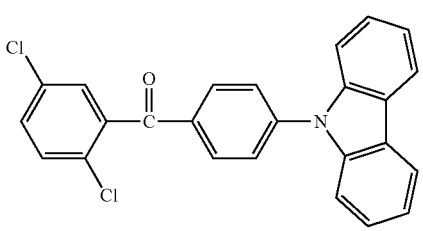

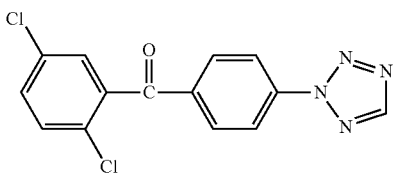

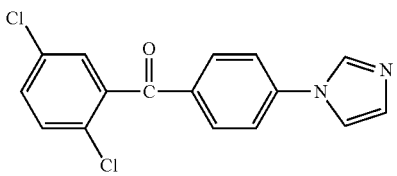

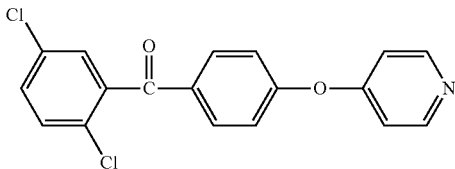

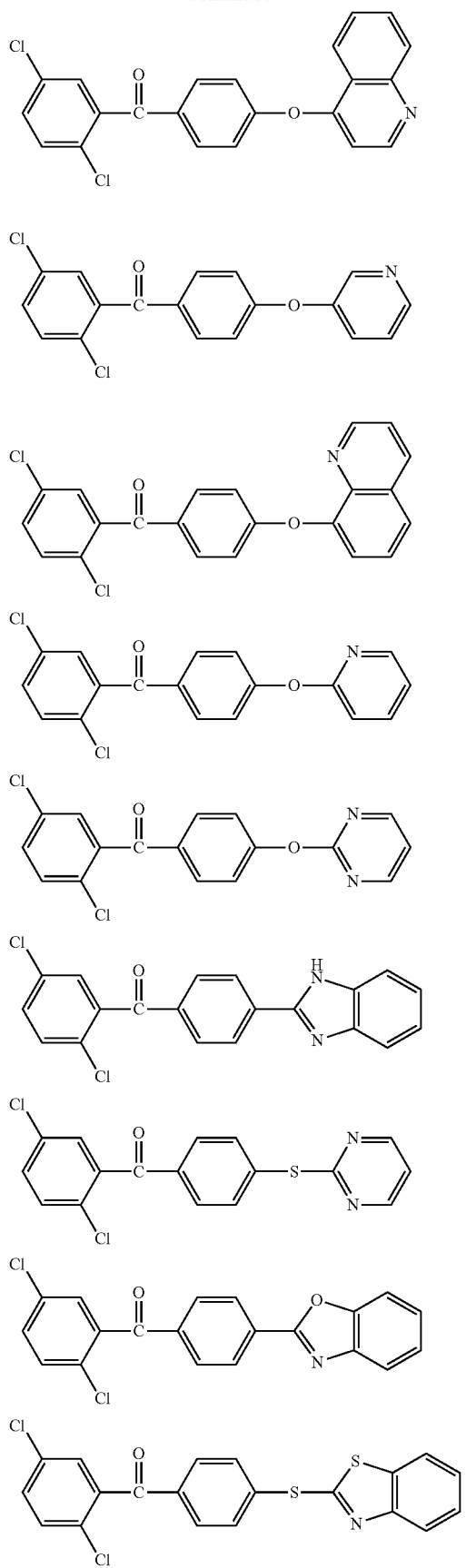
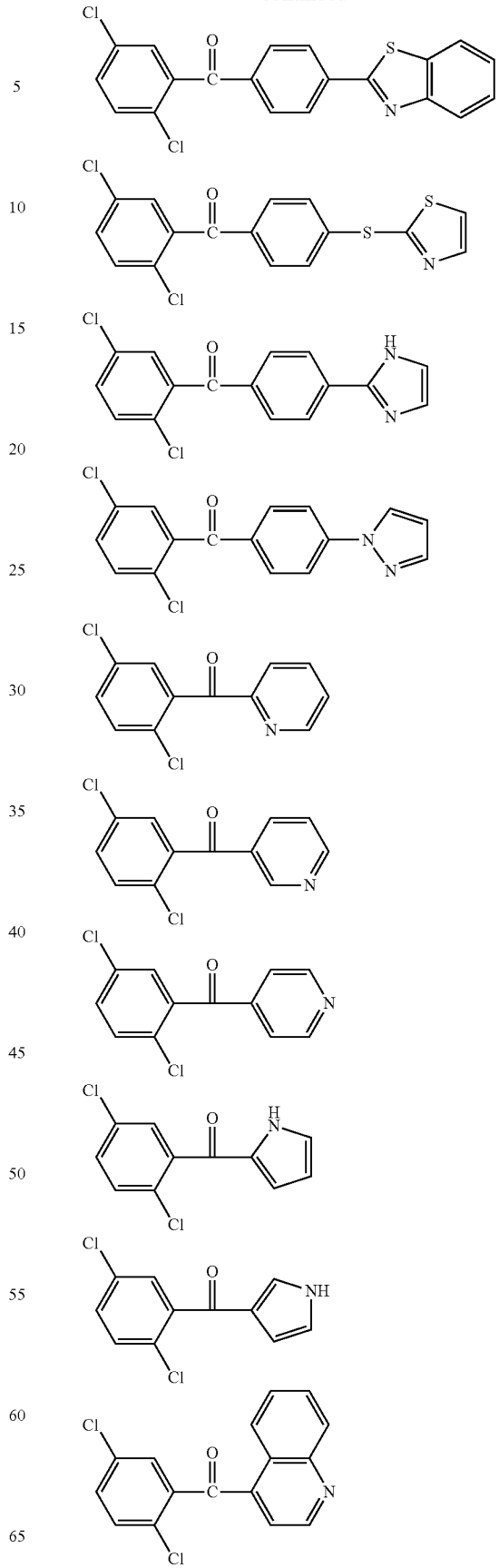

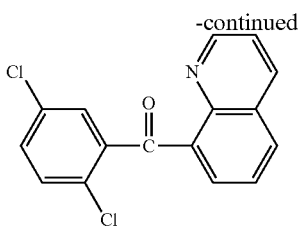

The examples further include the compounds in which a chlorine atom is replaced with a bromine atom and the isomers in which a chlorine atom or a bromine atom is bonded at different positions. Further examples include the compounds in which a —CO— bond is replaced with a —SO$_2$— bond. These compounds may be used singly or in a combination of two or more kinds.

Methods for synthesizing the compound (C) include nucleophilic substitution reaction between the compound represented by the following formula (26) and the nitrogen-containing heterocyclic compound.

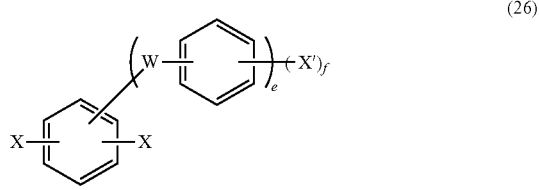

(26)

In the formula, X, W, e, and f are defined in the same way as in the formulae (24) and (25).

X' is a halogen atom; specifically, a fluorine atom or a chlorine atom is preferred, and a fluorine atom is more preferred.

Specific examples of the compounds represented by formula (26) include 2,4-dichloro-4'-fluorobenzophenone, 2,5-dichloro-4'-fluorobenzophenone, 2,6-dichloro-4'-fluorobenzophenone, 2,4-dichloro-2'-fluorobenzophenone, 2,5-dichloro-2'-fluorobenzophenone, 2,6-dichloro-2'-fluorobenzophenone, 2,4-dichlorophenyl-4'-fluorophenyl sulfone, 2,5-dichlorophenyl-4'-fluorophenyl sulfone, 2,6-dichlorophenyl-4'-fluorophenyl sulfone, 2,4-dichlorophenyl-2'-fluorophenyl sulfone. Of these compounds, 2,5-dichloro-4'-fluorobenzophenone is preferable.

The nitrogen-containing heterocyclic compound has an active hydrogen. This active hydrogen is subjected to substitution reaction with the group represented by X' in the compound represented by the formula (26).

Examples of the nitrogen-containing heterocyclic compound having the active hydrogen include pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline, 2-hydroxypyridine, 3-hydroxypyridine, 4-hydroxypyridine, 3-hydroxyquinoline, 8-hydroxyquinoline, 2-hydroxypyrimidine, 2-mercaptopyridine, 3-mercaptopyridine, 4-mercaptopyridine, 2-mercaptopyrimidine, and 2-mercaptobenzothiazole.

Of these compounds, pyrrole, imidazole, indole, carbazole, benzoxazole, benzimidazole, 2-hydroxypyridine, 3-hydroxypyridine, and 4-hydrodxypyridine are preferable.

The reaction of the compound represented by the formula (26) with the nitrogen-containing heterocyclic compound having an active hydrogen is preferably carried out in an organic solvent. A polar solvent is used such as N-methyl-2-pyrrolidone, N,N-dimethylacetamide, sulfolane, diphenyl sulfone, and dimethylsulfoxide. In order to promote the reaction, alkali metals, alkali metal hydrides, alkali metal hydroxides, alkali metal carbonates and the like are used. In the reaction, the ratio between the compound represented by the formula (26) and the nitrogen-containing heterocyclic compound having an active hydrogen is equimolar or an excessive amount of the nitrogen-containing heterocyclic compound having an active hydrogen. Specifically, the nitrogen-containing heterocyclic compound having an active hydrogen is used preferably 1 to 3 mol, particularly 1 to 1.5 mol relative to 1 mol of the compound represented by the formula (26).

The reaction temperature is 0° C. to 300° C., preferably 10° C. to 200° C. The reaction time is 15 minutes to 100 hours, preferably 1 hour to 24 hours. The products are preferably purified by a method such as recrystallization before used.

[Polymerization Method]

In order to obtain the intended polyarylene copolymer, at first, the above individual compounds are copolymerized to yield precursors. The copolymerization is carried out in the presence of a catalyst, and the catalyst used herein is a catalyst system containing a transition metal compound. The catalyst system contains as essential components (1) a transition metal salt and a compound to serve as a ligand (referred to as "ligand component" hereinafter) or a transition metal complex coordinated with a ligand (including copper salt) and (2) a reducing agent. A salt other than the transition metal salt may be further added in order to increase the polymerization rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride, nickel bromide, etc. are particularly preferred. Examples of the ligand include triphenylphosphine, tri(2-methyl)phenylphosphine, tri(3-methyl)phenylphosphine, tri(4-methyl)phenylphosphine, 2,2'-bipyridine, 1,5-cyclooctadiene, and 1,3-bis(diphenylphosphino)propane. Of these, triphenylphosphine, tri(2-methyl)phenylphosphine, and 2,2'-bipyridine are preferred. The ligands may be used singly or in combination of two or more kinds.

Examples of the transition metal (salts) coordinated with ligands include nickel chloride-bis(triphenylphosphine), nickel chloride-bis(tri(2-methyl)phenylphosphine), nickel bromide-bis(triphenylphosphine), nickel iodide-bis(triphenylphosphine), nickel nitrate-bis(triphenylphosphine), nickel chloride(2,2'-bipyridine), nickel bromide(2,2'-bipyridine), nickel iodide(2,2'-bipyridine), nickel nitrate(2,2'-bipyridine), bis(1,5-cyclooctadiene)nickel, tetrakis(triphenylphosphine)nickel, tetrakis(triphenylphosphite)nickel and tetrakis(triphenylphosphine)palladium. Of these, nickel chloride-bis(triphenylphosphine), nickel chloride-bis(tri(2-methyl)phenylphosphine), and nickel chloride(2,2'-bipyridine) are preferred.

Examples of the reducing agents employable in the catalyst system of the present invention include iron, zinc, manganese, aluminum, magnesium, sodium, and calcium, but zinc, magnesium and manganese are preferred. These reducing agents, if brought into contact with acids such as an organic acid, can be more activated and used.

Examples of the salts, other than the transition metal salts, employable in the catalyst system of the present invention, include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate, and lithium bromide. Of these, sodium bromide, sodium iodide, potassium bromide, lithium bromide, tetraethylammonium bromide and tetraethylammonium iodide are preferred.

The usage ratios of the individual components in the catalyst system are as follows. The transition metal salt or the transition metal (salt) coordinated with a ligand is used usually in an amount of 0.0001 to 10 mol, preferably 0.01 to 0.5 mol based on 1 mol of the total of the compound (A) capable of forming the structural unit represented by the general formula (1) and compound (B) capable of forming the structural unit represented by the general formula (3). When the amount is within this range, the polymerization reaction can proceed sufficiently, the catalytic activity can be high, and the molecular weight can be increased. If the amount is less than the above range, the polymerization does not proceed sufficiently, and if the amount is excessive, the molecular weight is decreased.

If the catalyst system contains the transition metal salt and the ligand, the ligand is used usually in an amount of 0.1 to 100 mol, preferably 1 to 10 mol, based on 1 mol of the transition metal salt. When the amount is within the above range, the polymerization proceeds sufficiently, and the polymer can be obtained at high yield. Additionally, the polymer can be easily purified.

The amount of the reducing agent used in the catalyst system is usually 0.1 to 100 mol, preferably 1 to 10 mol based on 1 mol of the total of the compound (A) capable of forming the structural unit represented by the general formula (1) and the compound (B) capable of forming the structural unit represented by the general formula (3). When the amount is within the above range, the polymerization proceeds sufficiently and the polymer can be obtained at high yield. When the amount is within the above range, the polymerization proceeds at high speed. Additionally, the obtained polymer can be easily purified. The reducing agent in an amount less than the lower limit does not allow the polymerization to proceed sufficiently, while the amount thereof exceeding the upper limit makes purification of the resulting polymer difficult.

If salts other than the transition metal salts are used in the catalyst system, the amount used is usually 0.001 to 100 mol, preferably 0.01 to 1 mol based on 1 mol of the total of the compound (A) capable of forming the structural unit represented by the general formula (1) and the compound (B) capable of forming the structural unit represented by the general formula (3). When the amount is less than 0.001 mol, the effect of increasing the polymerization rate is insufficient. On the other hand, when the amount exceeds 100 mol, the purification of the resulting polymer is difficult.

Examples of polymerization solvents employable in the present invention include tetrahydrofuran, cyclohexanone, dimethyl sulfoxide, N,N-dimethylformamide, N,N-dimethylacetamide, 1-methyl-2-pyrrolidone, γ-butyrolactone and γ-butyrolactam. Tetrahydrofuran, N,N-dimethylformamide, N,N-dimethylacetamide, and 1-methyl-2-pyrrolidone are preferred. These polymerization solvents are desirably used after dried sufficiently. In the polymerization solvent, the concentration of the compound (A) capable of forming the structural unit represented by the general formula (1) and the concentration of the compound (B) capable of forming the structural unit represented by the general formula (3) is usually 1 to 90% by weight, preferably 5 to 40% by weight.

The structural unit having the nitrogen-containing heterocyclic ring and other structural units, if introduced, are introduced such that the reaction between the compounds (A) and (B) involves the addition of a monomer corresponding to the compound (C) or other structural units, or such that the reaction between the compound (A) or (B) and the compound (C) is followed by the reaction between the resulting compound and a compound (A) or (B) that has not yet been reacted.

In the reaction of the compounds (A), (B), and (C), charging amounts correspond to respective compositions of the individual structural units.

In the polymerization to obtain the polymer of the present invention, the polymerization temperature is usually 0 to 200° C., preferably 50 to 80° C., and the polymerization time is usually 0.5 to 100 hours, preferably 1 to 40 hours.

In the above production method, the sulfonate group contained in the obtained copolymer is converted to a sulfonic acid group ($-SO_3H$).

Specific examples include:

a method in which (1) the above polyarylene is poured into an excess amount of water or alcohol containing a small amount of hydrochloric acid and the resulting mixture is stirred for 5 minutes or longer;

a method in which (2) the above polyarylene is reacted in trifluoroacetic acid in a temperature range of 80 to 120° C. for approximately 5 to 10 hours; and a method in which (3) the above polyarylene is reacted in a solution, for example, a solution of N-methylpyrrolidone and the like containing lithium bromide in an amount of 1 to 9 mols relative to 1 mol of the sulfonate group ($-SO_3R$) in the polyarylene, in a temperature range of 80 to 150° C. for approximately 3 to 10 hours, and into the reaction solution, hydrochloric acid is added.

The sulfonic acid metal salts are subjected to a method such as ion exchange method, and thereby hydrogen substitution is carried out.

(Method B1)

In the Method B1, when Ar in the general formula (3) or (3-1) is an aromatic group having a substituent represented by $-O(CH_2)_pSO_3H$ or $-O(CF_2)_pSO_3H$, for example, similarly to the method disclosed in Patent Application No. 2003-295974 (Japanese Unexamined Patent Application Publication No. 2005-60625), the polymer may be synthesized by a method in which a precursor (precursor compound represented by the formula (1-5)) which will form the structural unit represented by the general formula (1) and a monomer of a precursor which will form the structural unit represented by the general formula (3) or (3-1) are copolymerized, and into the copolymer, an alkyl sulfonic acid or an alkyl sulfonic acid substituted with fluorine is introduced.

Specifically, the copolymerization employs monomers having a skeleton represented by the general formula (3) or (3-1) and not having a sulfonic acid group or a sulfonate group, the monomer having ends including an OR" group and/or a SR" group (hydrocarbon group) (monomers represented by the following formulae (3' a), (3'b), (3'-1a) and (3'-1b)) and a compound represented by the formula (1-5), and then the OR" group and the SR" group are substituted with a —OM group and a —SM group, respectively (M is a hydrogen atom or an alkali metal atom). Thereafter, the resultant is reacted with a compound represented by the following general formula (7) or (8) under alkali conditions. Thereby, the polymer can be produced. Note that deesterification and desalination may be performed as needed.

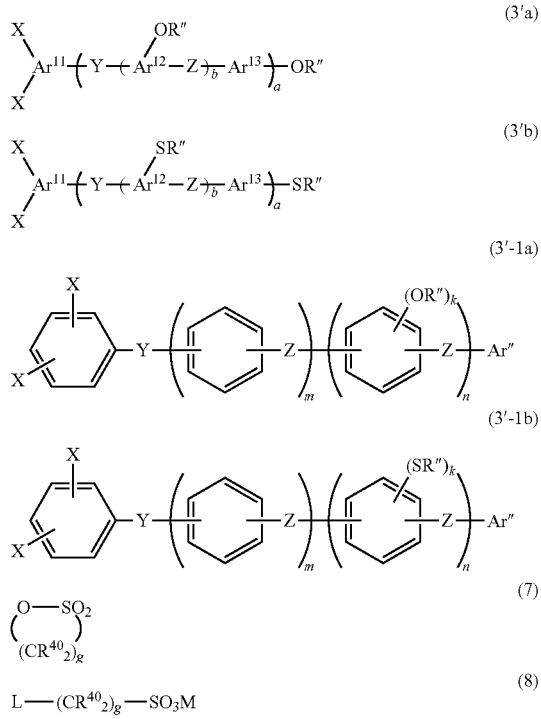

In the formulae (3' a), (3b'), (3'-1a), and (3'-1b), Y, Z, $Ar^{11}$, $Ar^{12}$, and $Ar^{13}$, a, b, m, n, and k are defined in the same way as in the formulae (3), (3-1), and (3-2).

X is a halogen atom, R" is a hydrocarbon group, and Ar" is an aromatic group having OR" group or SR" group (R" is a hydrocarbon group).

In the formulae (7) and (8), $R^{40}$ is at least one atom or group selected from the group consisting of a hydrogen atom, a fluorine atom, an alkyl group, and a fluorine-substituted alkyl group; and g is an integer of from 1 to 20.

In the formula (8), L is any of a chlorine atom, a bromine atom, and an iodine atom; and M is a hydrogen atom, or an alkali metal atom.

[Method for Producing Electrolyte Membrane]

The polyarylene copolymer of the present invention comprises the above copolymer. The polyarylene copolymer, when used for electrolytes for primary and secondary batteries, solid polymer electrolytes for fuel cells, display elements, various sensors, signaling media, solid condensers and ion exchange membranes, etc., can be at a membrane state, at a solution state, or at powder state. Among these states, the membrane state and the solution state are preferable (hereinafter, the membrane state is called a polymer electrolyte membrane).

The polymer electrolyte membrane of the present invention can be produced by, for example, casting method in which the polyarylene copolymer mixed in an organic solvent is flow-cast over a substrate to form a film. The substrate used herein is not particularly limited and may be selected from those substrates commonly used in the solution casting methods. Examples thereof include plastic substrates and metal substrates. Preferably, substrates formed from thermoplastic resin such as polyethyleneterephthalate (PET) films are used.

The solvents for mixing the polyarylene copolymer are any solvents which dissolves or swells the copolymer, with examples including aprotic polar solvents such as N-methyl-2-pyrrolidone, N,N-dimethylformamide, γ-butyrolactone, N,N-dimethylacetamide, dimethylsulfoxide, dimethylurea, dimethylimidazolidinone, and acetonitrile; chlorine-based solvents such as dichloromethane, chloroform, 1,2-dichloroethane, chlorobenzene, and dichlorobenzene; alcohols such as methanol, ethanol, propyl alcohol, iso-propyl alcohol, sec-butyl alcohol and tert-butyl alcohol; alkylene glycol monoalkyl ethers such as ethylene glycol monomethyl ether, ethylene glycol monoethyl ether, and propylene glycol monoethyl ether; ketones such as acetone, methylethylketone, cyclohexanone, γ-butyllactone; ethers such as tetrahydrofuran, and 1,3-dioxane. These solvents may be used singly, or in combination of two or more kinds. In particular, in terms of solubility and solution viscosity, N-methyl-2-pyrrolidone (hereinafter, also called "NMP") is preferable.

When the above solvent is a mixture of the aprotic polar solvent and other solvents, the mixture contains the aprotic polar solvent in an amount of 95 to 25% by weight, preferably 90 to 25% by weight, and the other solvents in an amount of 5 to 75% by weight, preferably 10 to 75% by weight, provided that the total is 100% by weight. The proportion of the other solvents falling within this range provides an excellent effect of reducing the solution viscosity. Preferable combination of the aprotic polar solvent and other solvents is NMP, as the aprotic polar solvent, and methanol, as the other solvents, which will provide an effect of reducing the solution viscosity over a wide range of compositional ranges.

The concentration of the polymer in the solution obtained by dissolving the copolymer and an additive depends on the molecular weight of the sulfonic acid-containing polyarylene copolymer, but is usually from 5 to 40% by weight, preferably from 7 to 25% by weight. When the concentration of the polymer is within the above described range, a film with a desired thickness can be formed without causing pin holes and the like. Additionally, from the perspective of viscosity of the solution, it is easy to form a film, and the obtained film is superior in surface smoothness.

The solution viscosity depends on the molecular weight of the polyarylene copolymer, and the concentration of the polymer, but usually ranges from 2,000 to 100,000 mPa·s, preferably from 3,000 to 50,000 mPa·s. In case the viscosity is within the range, solution retainability during film-formation is good, and the solution does not flow away from substrate. Additionally, because of low viscosity, it is easy to extrude from die and film-forming via flow expanding method is facilitated.

After the membrane is formed as described above, the undried film obtained may be soaked into water to substitute the organic solvent in the undried film with water. This treatment reduces the amount of the residual solvent in the resultant polymer electrolyte membrane.

After the membrane formation, and before the soaking of the undried film into water, the undried film may be predried. The predrying is performed by holding the undried film at a temperature of 50 to 150° C. for 0.1 to 10 hours.

If the undried film is soaked into water and then dried, as described above, a membrane is obtained which has a reduced amount of the residual solvent. The amount of the residual solvent in the membrane thus obtained is usually not more than 5% by weight. Depending on soaking conditions, the amount of the residual solvent in the resultant membrane can be not more than 1% by weight.

Examples of the conditions are such that the amount of water used for 1 part by weight of the undried film is not less than 50 parts by weight, the temperature of water in soaking is 10 to 60° C., and soaking time is 10 minutes to 10 hours.

After the undried film is soaked in water as described above, the film is dried at 30 to 100° C., preferably at 50 to 80°

C., for 10 to 180 minutes, preferably for 15 to 60 minutes. Subsequently, the resultant is vacuum dried at 50 to 150° C. for 0.5 to 24 hours, preferably under a reduced pressure of 500 to 0.1 mm Hg, whereby the membrane can be obtained.

The polymer electrolyte membrane obtained by the method of the present invention usually has a dry thickness from 10 to 100 μm, preferably from 20 to 80 μm.

The polymer electrolyte membrane can be also produced by molding the polyarylene copolymer having the above sulfonate group or an alkali metal salt of the above sulfonic acid into a film by the above-described method, and then by subjecting the film to an appropriate post-treatment such as hydrolysis and acid treatment. Specifically, the polyarylene copolymer having the above sulfonate group or the above alkali metal salt of a sulfonic acid is molded into a film by the above-described method, and the membrane is subjected to hydrolysis or acid treatment, whereby the polymer electrolyte membrane comprising the polyarylene copolymer can be produced.

The production of the polymer electrolyte membrane may involve, together with the above polyarylene copolymer, inorganic acids such as sulfuric acid and phosphoric acid, phosphate glass, tungstic acid, phosphate hydrate, inorganic proton conductive particles such as β-alumina proton substituents, and proton-introducing oxides, an organic acid containing a carboxylic acid, an organic acid containing a sulfonic acid, an organic acid containing a phosphonic acid, an appropriate amount of water, and the like.

EXAMPLES

Hereinafter, the present invention will be described in detail with reference to Examples, but the present invention is not limited by the following Examples. In Examples, the reference to "%" means "% by weight" unless otherwise noted.

[Preparation of Electrolyte Membrane for Evaluation]

The copolymer obtained in each Example and Comparative Example was dissolved in N-methylpyrrolidone/methanol solution. The solution was cast over a PET substrate by the use of an applicator, and then was dried using an oven at 60° C. for 30 minutes, at 80° C. for 40 minutes, and at 120° C. for 60 minutes to form an adequate thickness. A membrane dried was soaked in deionized water. After the soaking, the membrane wad dried at 50° C. for 45 minutes, thereby obtaining a membrane for evaluation.

[Molecular Weight]

The copolymer obtained in each Example and Comparative Example was dissolved in N-methylpyrrolidone buffer solution (hereinafter, called NMP buffer solution), and by gel permeation chromatography (GPC), the number average molecular weight (Mn) and the weight average molecular weight (Mw) in terms of polystyrene were obtained. The NMP buffer solution was prepared in such a ratio: NMP (3 L)/phosphoric acid (3.3 mL)/lithium bromide (7.83 g).

[Sulfonic Acid Equivalent]

A sulfonated polymer obtained was washed using distilled water until washings became neutral, and free residual acids were removed, which was followed by drying. A predetermined amount of the polymer was weighed and dissolved in a THF/water mixed solvent. The resultant solution was mixed with phenolphthalein as an indicator, and the mixture was titrated with a NaOH standard solution to obtain a point of neutralization, from which the sulfonic acid equivalent (ion exchange capacity) (meq/g) was determined.

[Hot Water Experiment: How to Obtain Swelling/Shrinkage]

A film was cut into 2.0 cm×3.0 cm, and weighed, thereby providing a test piece for an experiment. The test piece was held under the conditions of 24° C., and a relative humidity (RH) of 50%. Then, the test piece was put into a 250 mL bottle made of polycarbonate. Thereto, approximately 100 mL of distilled water was added. The bottle was heated at 120° C. for 24 hours by the use of a pressure cooker tester (PC-242HS, manufactured by HIRAYAMA MFS CORP). After the experiment, respective films were taken out from the hot water, and water at the surface was slightly wiped off with a kimwipe. Then, the dimension was measured to thereby obtain a swelling percentage. The state of the membrane was adjusted under the conditions of 24° C. and RH of 50%, and water was distilled away. The dimension of the membrane after the hot water experiment was measured to thereby obtain a shrinkage percentage. A swelling/shrinkage was obtained on the basis of the following relation.

Swelling percentage=(dimension of 2 cm-side of the membrane in water/2+dimension of 3 cm-side of the membrane in water/3)×100/2

Shrinkage percentage=(dimension of 2 cm-side of the membrane dried/2+dimension of 3 cm-side of the membrane dried/3)×100/2

Swelling/Shrinkage=(Swelling percentage−100)+ (100−Shrinkage percentage)

[Measurement of Proton Conductivity]

An alternating current resistance was measured by pressing a platinum wire (f=0.5 mm) on a surface of a rectangular sample membrane 5 mm wide, which was kept in a constant temperature and humidity apparatus to determine an alternate current impedance between the platinum wires. That is, impedance under the environment of 85° C. and relative humidity of 90% was measured at an alternate current of 10 kHz. A chemical impedance measurement system manufactured by NF Corporation was used as a resistance measurement instrument and JW241 manufactured by Yamato Scientific Co., Ltd. was used as a constant temperature and humidity apparatus.

Five platinum wires were pressed at an interval of 5 mm and a distance between wires were varied between 5 and 20 mm to measure the alternate current resistance. The resistivity of a membrane was calculated from a gradient in a relation of the distance between wires and the resistance. The reciprocal number of the specific electrical resistance corresponds to the proton conductivity.

Specific electrical resistance $R$ (Ω·cm)=0.5 (cm)× membrane thickness (cm)×gradient in resistance vs. wire distance (0/cm)

Synthesis of Structural Unit Having Sulfonic Acid Group

Into a 3 L three-neck flask equipped with a stirrer, and a cooling tube, chlorosulfonic acid (233.0 g, 2 mol) was added, and then 2,5-dichlorobenzophenone (100.4 g, 400 mmol) was added. The mixture was reacted for 8 hours using an oil bath at 100° C. After a predetermined period of time, the reaction liquid was slowly poured into broken ice (1000 g), and extraction using ethyl acetate was carried out. An organic layer was washed with a saline solution, and was dried with magnesium sulfate. Then, the ethyl acetate was distilled away, thereby obtaining a crude crystal of pale yellow (3-(2,5-dichlorobenzoyl)benzene sulfonic acid chloride). The crude crystal was employed at the subsequent step without purification.

2,2-dimethyl-1-propanol(neopentylalcohol) (38.8 g, 440 mmol) was added into 300 mL of pyridine, and the mixture was cooled to approximately 10° C. Thereto, the crude crystal obtained above was slowly added over approximately 30 minutes. After the addition of the whole amount, the resultant was stirred for 30 minutes and thereby reacted. After the reaction, the reaction liquid was poured into 1000 mL of hydrochloric acid water, and a solid was precipitated and collected. The solid obtained was dissolved in ethyl acetate, and the solution was washed with a sodium bicarbonate aqueous solution and a saline water. The solution washed was dried with magnesium sulfate, and then ethyl acetate was distilled away, thereby obtaining a crude crystal. The crude crystal was allowed to recrystallize in methanol. Thereby, an intended product, a white crystal of 3-(2,5-dichlorobenzoyl) benzene sulfonic acid neopentyl (30-1) was obtained.

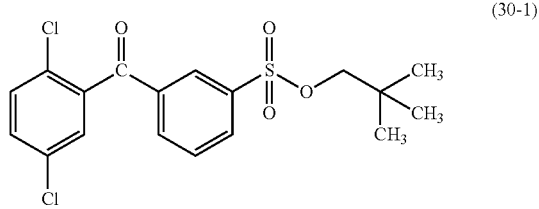 [SMILES: CC(C)(C)COS(=O)(=O)c1cccc(C(=O)c2cc(Cl)ccc2Cl)c1]

(30-1)

Synthesis of Basic Structural Unit

Into a 2 L three-neck flask equipped with a stirrer, a thermometer and a nitrogen-introducing tube, 240.2 g (2.50 mol) of fluorobenzene was introduced, and was cooled to 10° C. in an ice bath. Then, 134.6 g (0.50 mol) of 2,5-dichlorobenzoic acid chloride, and 86.7 g (0.65 mol) of aluminum chloride were slowly added such that the reaction temperature would not exceed 40° C. After the addition, the mixture was stirred at 40° C. for 8 hours. After the disappearance of the raw materials was confirmed by thin-layer chromatography, the mixture was dropped in iced water, and extraction using ethyl acetate was carried out. The extraction liquid was neutralized by 5% sodium bicarbonate water, and the resultant was washed with saturated saline water. The liquid washed was dried with magnesium sulfate, and then the solvent was distilled away using an evaporator. The residue was allowed to recrystallize in methanol, thereby an intermediate product, 2,5-dichloro-4'-fluorobenzophenone, was obtained. Amount obtained was 130 g, and yield percentage was 97%. Note that, the yield percentage was calculated by following formula (hereinafter, the same): yield percentage (%)=(amount of product obtained/theoretical amount of product)×100.

Into a 2 L three-neck flask equipped with a stirrer, a thermometer, a cooling tube, a Dean-Stark tube, and a nitrogen-introducing three-way cock, 130.5 g (0.49 mol) of the above 2,5-dichloro-4'-fluorobenzophenone, 46.1 g (0.49 mol) of 2-hydroxypyridine, and 73.7 g (0.53 mol) of potassium carbonate were introduced. Then, 500 mL of N,N-dimethylacetamide (DMAc), and 100 mL of toluene were added, and in an oil bath, the mixture was heated under nitrogen atmosphere, and was reacted at 130° C. under stirring. Water resulting from the reaction was formed into an azeotropic mixture with toluene and was removed to the outside of the system through the Dean-Stark tube during the reaction. Approximately 3 hours thereafter, almost no water was recognized to be generated. Then, most of the toluene was removed, and the reaction was allowed to continue at 130° C. for 10 hours. A reaction liquid obtained was allowed to cool down, and then the reaction liquid was poured into 2 L of water/methanol (9/1). A product precipitated was filtered, and the filtrate was collected and dried. The dried product was introduced into a 2 L three-neck flask equipped with a stirrer, a thermometer, a cooling tube, a Dean-Stark tube, and a nitrogen-introducing three-way cock. The dried product was stirred in 1 L of toluene at 100° C., while the residual water content was distilled away, to thereby dissolve the dried product. After the solution was allowed to cool down, a crystallized product was filtered to thereby obtain an intended product of pale yellow, 2,5-dichloro-4'-(pyridine-2-oxy) benzophenone (30-2) in an amount of 142 g, and at an yield percentage of 83%.

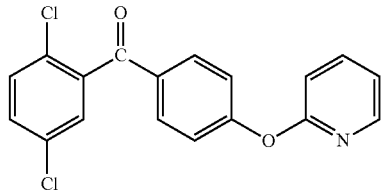

(30-2)

Example 1

Synthesis of Structural Unit Having No Sulfonic Acid Group

Into a 1 L three-neck flask equipped with a stirrer, a thermometer, a Dean-Stark tube, a nitrogen-introducing tube and a cooling tube, 90.1 g (0.52 mol) of 2,6-dichlorobenzonitrile, 59.1 g (0.48 mol) of 2-methylhydroquinone, and 85.6 g (0.62 mol) of potassium carbonate were weighed. After the flask was purged with nitrogen, 599 mL of sulfolane and 299 mL of toluene were added, and the mixture was stirred. In an oil bath, a reaction liquid was heated and refluxed at 150° C. Water generated by the reaction was trapped in the Dean-Stark tube. 3 hours thereafter, almost no water was recognized to be generated, at which time, toluene was removed through the Dean-Stark tube to the outside of the system. With the reaction temperature slowly increased from 180 to 190° C., the stirring was carried out for 3 hours, and then 24.6 g (0.14 mol) of 2,6-dichlorobenzonitrile was added. The reaction was further allowed to proceed for 5 hours.

After the reaction liquid was allowed to cool down, the reaction liquid was poured into 2395 mL of a methanol/4 wt % (volume ratio: 5/1) sulfuric acid solution for precipitation. A product precipitated was filtered, and the filtrate was stirred in 2395 mL of water at 55° C. for 1 hour. The resultant was filtered, and the filtrate was again stirred in 2395 mL of water at 55° C. for 1 hour. The resultant was filtered, and further the filtrate was stirred in 2395 mL of methanol at 55° C. for 1 hour. The resultant was filtered, and the filtrate was again stirred in 2395 mL of methanol at 55° C. for 1 hour. The resultant was filtered. The filtrate was dried in air, and vacuum dried at 80° C. As a result, 100 g of an intended product (yield percentage: 90%) was obtained.

Mn measured by GPC was 7,200. The compound obtained was identified to be an oligomer represented by the formula (40-1).

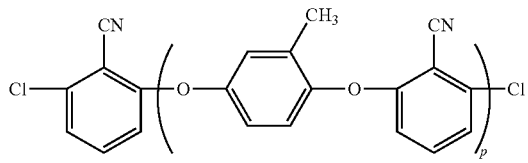

(40-1)

Synthesis of Sulfonated Block Polymer 38.99 g (97.1 mmol) of the compound represented by the above (30-1), 0.334 g (0.97 mmol) of the compound represented by the above (30-2), 14.05 g (1.95 mmol) of the compound represented by the above (40-1), 1.96 g (3.0 mmol) of bis(triphenylphosphine)nickeldichloride, 2.36 g (9 mmol) of triphenylphosphine, and 11.77 g (180 mmol) of zinc were mixed. In the mixture, 160 mL of dried dimethylacetamide (DMAc) was added under nitrogen.

The reaction system was heated under stirring (heated eventually to 79° C.), and the reaction was made for 3 hours. During the reaction, the increase in viscosity in the system was observed. The polymerization reaction solution was diluted with 193 mL of DMAc, and the resultant was stirred for 30 minutes, and filtered using Celite as a filter aid.

Into the filtrate, 29.51 g (340 mmol) of lithium bromide was added, and the mixture was reacted, with the temperature of the mixture being 120° C., for 7 hours, under nitrogen atmosphere. After the reaction, the reaction liquid was cooled to room temperature, which was poured to 4.1 L of water for precipitation. A product precipitated was soaked in acetone, and the resultant was filtered. Then, the filtrate was washed. The washed product, while being stirred in 6500 g of 1N sulfuric acid, was washed. The product was filtered, and the filtrate was washed with ion exchange water until the pH of the washings became 5 or more. The result of the molecular weight measurement by GPC and the ion exchange capacity of the obtained polymer are shown in Table 1. It was found that the polymer obtained was represented by the following general formula (50-1).

quinone, the oligomer represented by the (40-2) below was obtained in the same manner as Example 1. Mn measured by GPC was 6,500.

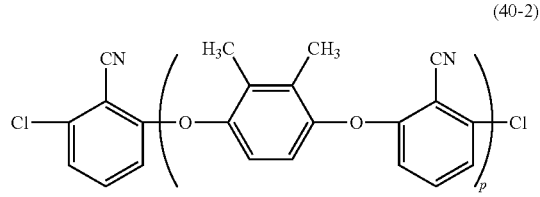

(40-2)

Additionally, other than changing the used amount of the compound represented by the above (30-1) to 38.87 g (96.9 mmol), the used amount of the compound represented by the above (30-2) to 0.333 g (0.97 mmol), the used amount of the compound represented by the above (40-2) to 14.03 g (2.16 mmol), and the used amount of lithium bromide to 29.45 g (340 mmol), the polymer represented by the (50-2) below was obtained in the same manner as Example 1. The result of the molecular weight measurement by GPC and the ion exchange capacity of the obtained polymer are shown in Table 1.

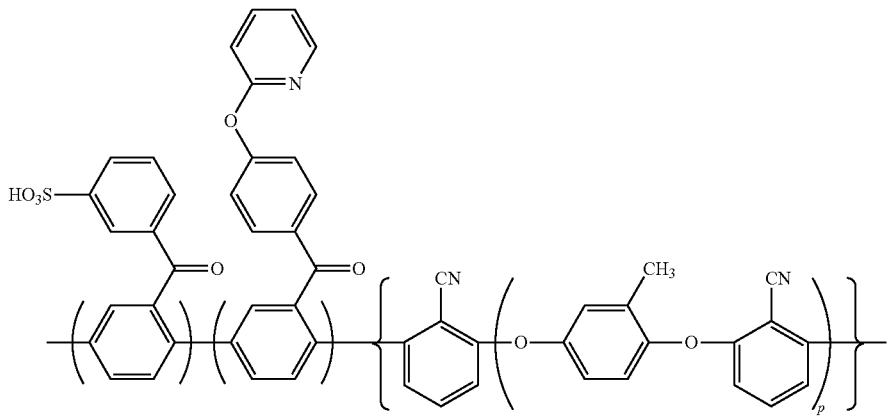

(50-1)

Example 2

Other than changing the 59.1 g (0.48 mol) of 2-methylhydroquinone to 65.8 g (0.48 mol) of 2,3-dimethylhydro-

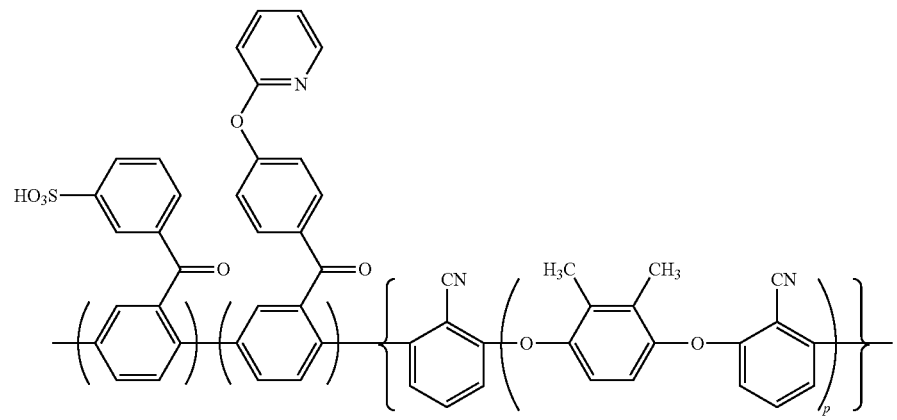

(50-2)

Example 3

Other than changing the 59.1 g (0.48 mol) of 2-methylhydroquinone to 44.3 g (0.36 mol) of 2-methylhydroquinone and 16.5 g (0.12 mol) 2,3-dimethylhydroquinone, the oligomer represented by the (40-3) below was obtained in the same manner as Example 1. Mn measured by GPC was 6,800.

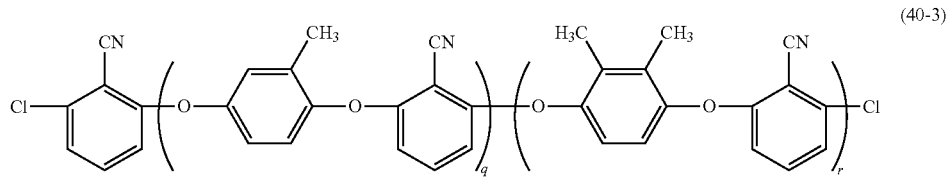

(40-3)

Additionally, other than changing the used amount of the compound represented by the above (30-1) to 38.91 g (97.0 mmol), the used amount of the compound represented by the above (30-2) to 0.334 g (0.97 mmol), the used amount of the compound represented by the above (40-3) to 14.04 g (2.06 mmol), and the used amount of lithium bromide to 29.48 g (340 mmol), the polymer represented by the (50-3) below was obtained in the same manner as Example 1. The result of the molecular weight measurement by GPC and the ion exchange capacity of the obtained polymer are shown in Table 1.

After the reaction liquid was allowed to cool down, the reaction liquid was poured into 875 mL of a methanol/4 wt % (volume ratio: 5/1) sulfuric acid solution for precipitation. A product precipitated was filtered, and the filtrate was stirred in 875 mL of water at 55° C. for 1 hour. The resultant was filtered, and the filtrate was again stirred in 875 mL of water at 55° C. for 1 hour. The resultant was filtered, and further the filtrate was stirred in 875 mL of methanol at 55° C. for 1 hour. The resultant was filtered, and the filtrate was again stirred in 875 mL of methanol at 55° C. for 1 hour. The resultant was filtered. The filtrate was dried in air, and vacuum dried at 80° C. As a result, 43.2 g of an intended product (yield percentage: 95%) was obtained. Mn measured by GPC was 4,700. The compound obtained was identified to be an oligomer represented by the formula (40-4).

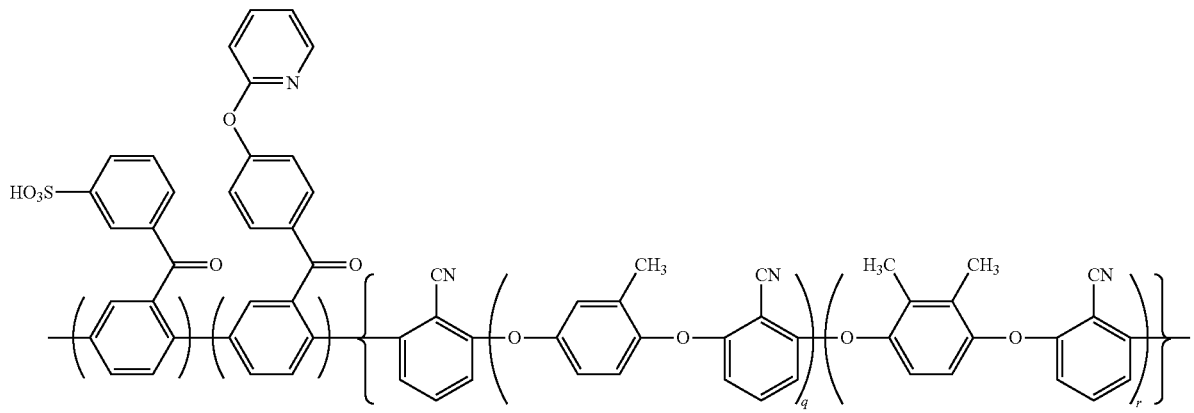

(50-3)

Example 4

Into a 1 L three-neck flask equipped with a stirrer, a thermometer, a Dean-Stark tube, a nitrogen-introducing tube and a cooling tube, 32.1 g (0.187 mol) of 2,6-dichlorobenzonitrile, 27.2 g (0.163 mol) of 2-tert-butylhydroquinone, and 31.0 g (0.224 mol) of potassium carbonate were weighed. After the flask was purged with nitrogen, 219 mL of sulfolane and 109 mL of toluene were added, and the mixture was stirred. In an oil bath, the reaction liquid was heated and refluxed at 130° C. Water generated by the reaction was trapped in the Dean-Stark tube. 3 hours thereafter, almost no water was recognized to be generated, at which time, toluene was removed through the Dean-Stark tube to the outside of the system. With the reaction temperature slowly increased from 180 to 190° C., the stirring was carried out for 7 hours, and then 12.0 g (0.070 mol) of 2,6-dichlorobenzonitrile was added. The reaction was further allowed to proceed for 5 hours.

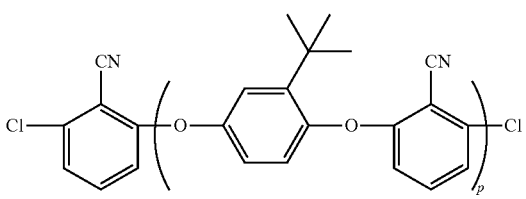

(40-4)

19.27 g (48.0 mmol) of the compound represented by the above (30-1), 0.165 g (0.48 mmol) of the compound represented by the above (30-2), 7.30 g (1.49 mmol) of the compound represented by the above (40-4), 0.98 g (1.5 mmol) of bis(triphenylphosphine)nickeldichloride, 1.18 g (4.5 mmol) of triphenylphosphine, and 5.88 g (90 mmol) of zinc were mixed. In the mixture, 80 mL of dried dimethylacetamide (DMAc) was added under nitrogen.

The reaction system was heated under stirring (heated eventually to 80° C.), and allowed to react for 3 hours. During the reaction, the increase in viscosity in the system was observed. The polymerization reaction solution was diluted with 129 mL of DMAc, and the resultant was stirred for 30 minutes, and filtered using Celite as a filter aid.

Into the filtrate, 14.60 g (168 mmol) of lithium bromide was added, and the mixture was reacted, with the temperature of the mixture being 120° C., for 7 hours, under nitrogen atmosphere. After the reaction, the reaction liquid was cooled to room temperature, which was poured to 2.0 L of water for precipitation. A product precipitated was soaked in acetone, and the resultant was filtered. Then, the filtrate was washed. The washed product, while being stirred in 3200 g of 1N sulfuric acid, was washed. The product was filtered, and the filtrate was washed with ion exchange water until the pH of the washings became 5 or more. The result of the molecular weight measurement by GPC and the ion exchange capacity of the obtained polymer are shown in Table 1. It was found that the polymer obtained was represented by the following general formula (50-4).

obtained in the same manner as Example 4. Mn measured by GPC was 6,900.

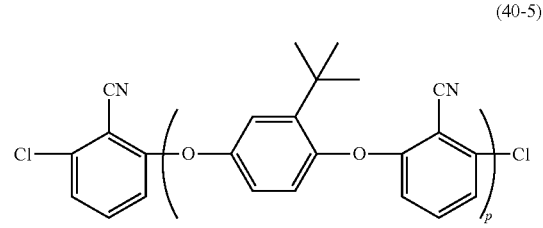
(40-5)

Additionally, other than changing the used amount of the compound represented by the above (30-1) to 19.46 g (48.5 mmol), the used amount of the compound represented by the above (30-2) to 0.167 g (0.49 mmol), the used amount of the compound represented by the above (40-5) to 7.33 g (1.03 mmol), the used amount of bis(triphenylphosphine)nickel-

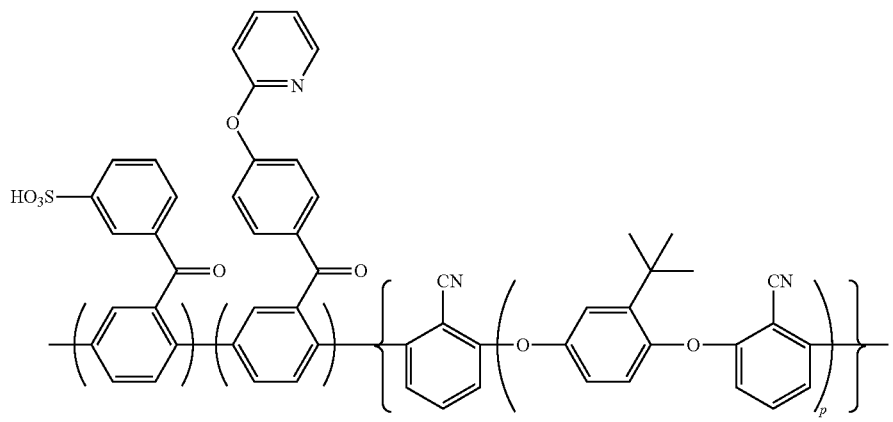
(50-4)

Example 5

Other than changing the reactants to 31.5 g (0.183 mol) of 2,6-dichlorobenzonitrile, 27.7 g (0.167 mol) of 2-tert-butyl-hydroquinone, and 30.4 g (0.220 mol) of potassium carbonate, and other than changing the additive which was added during the reaction to 8.6 g (0.050 mol) of 2,6-dichlorobenzonitrile, the oligomer represented by the (40-5) below was dichloride to 1.31 g (2.0 mmol), the used amount of triphenylphosphine to 1.57 g (6.0 mmol), the used amount of zinc to 7.84 g (120 mmol), and the used amount of lithium bromide to 14.74 g (170 mmol), the polymer represented by the (50-5) below was obtained in the same manner as Example 4. The result of the molecular weight measurement by GPC and the ion exchange capacity of the obtained polymer are shown in Table 1.

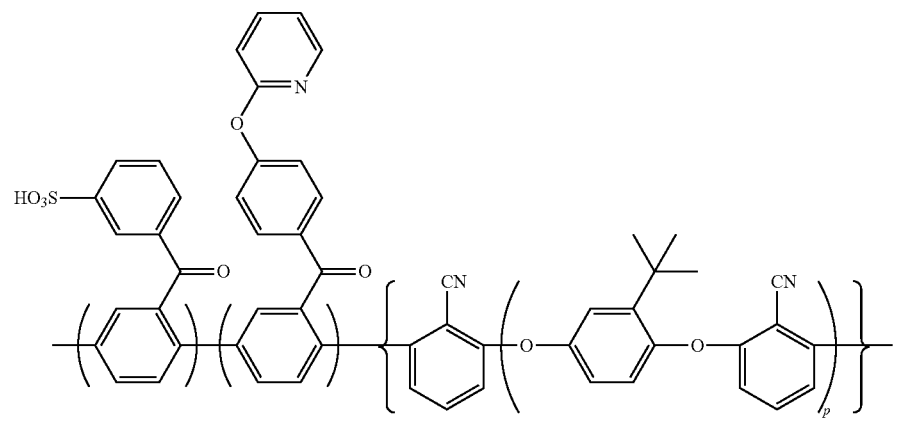
(50-5)

Example 6

Other than changing the 59.1 g (0.48 mol) of 2-methylhydroquinone to 159.3 g (0.48 mol) of 2,5-di-1,1,3,3-tetramethylbutylhydroquinone, the oligomer represented by the (40-6) below was obtained in the same manner as Example 1. Mn measured by GPC was 6,400.

Example 7

Other than changing the 59.1 g (0.48 mol) of 2-methylhydroquinone to 119.2 g (0.48 mol) of 2,5-di-tert-amylhydroquinone, the oligomer represented by the (40-7) below was obtained in the same manner as Example 1. Mn measured by GPC was 6,600.

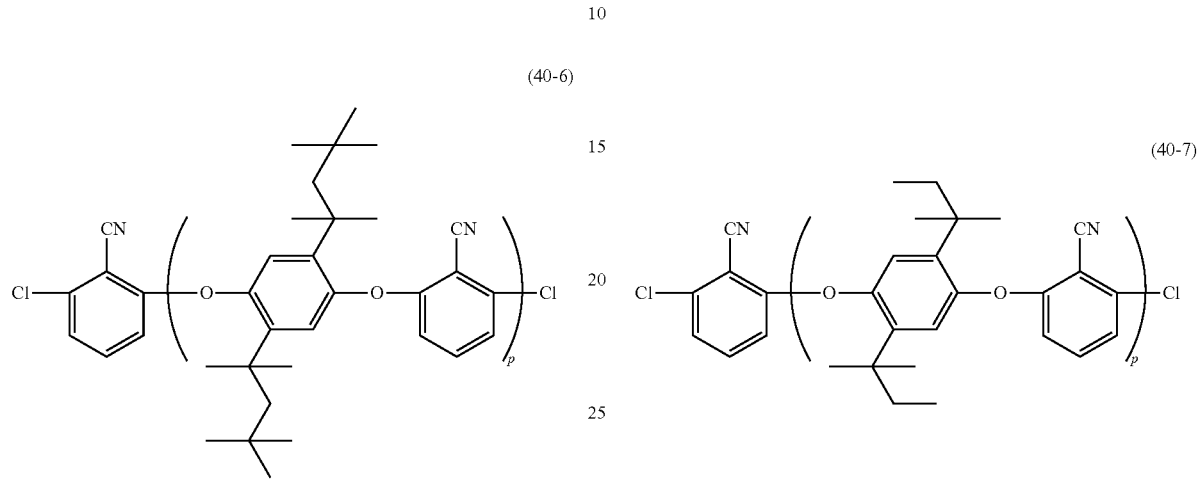

Additionally, other than changing the used amount of the compound represented by the above (30-1) to 38.86 g (97.0 mmol), the used amount of the compound represented by the above (30-2) to 0.333 g (0.97 mmol), the used amount of the compound represented by the above (40-6) to 14.03 g (2.19 mmol), and the used amount of lithium bromide to 29.44 g (340 mmol), the polymer represented by the (50-6) below was obtained in the same manner as Example 1. The result of the molecular weight measurement by GPC and the ion exchange capacity of the obtained polymer are shown in Table 1.

Additionally, other than changing the used amount of the compound represented by the above (30-1) to 38.89 g (97.0 mmol), the used amount of the compound represented by the above (30-2) to 0.334 g (0.97 mmol), the used amount of the compound represented by the above (40-7) to 14.04 g (2.13 mmol), and the used amount of lithium bromide to 29.46 g (340 mmol), the polymer represented by the (50-7) below was obtained in the same manner as Example 1. The result of the molecular weight measurement by GPC and the ion exchange capacity of the obtained polymer are shown in Table 1.

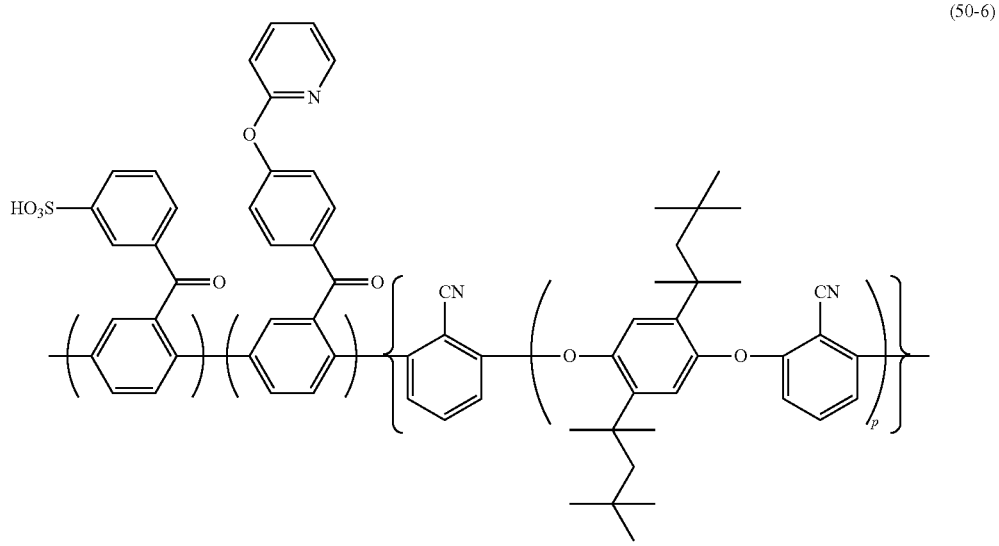

(50-7)

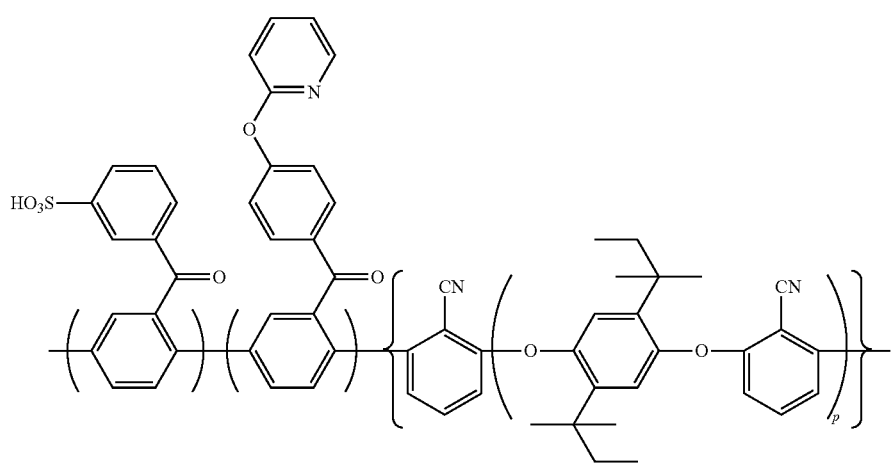

Example 8

Other than changing the 59.1 g (0.48 mol) of 2-methylhydroquinone to 39.83 g (0.12 mol) of 2,5-di-1,1,3,3-tetramethylbutylhydroquinone and 79.4 g (0.36 mol) of tert-butylhydroquinone, the oligomer represented by the (40-8) below was obtained in the same manner as Example 1. Mn measured by GPC was 6,400.

(40-8)

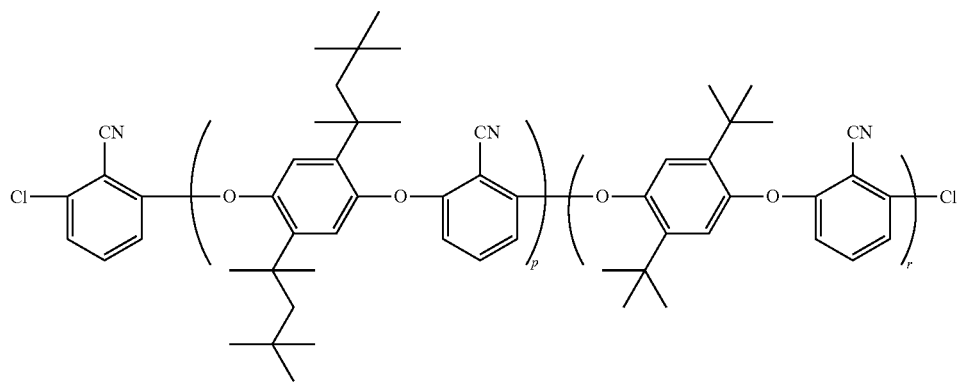

Additionally, other than changing the used amount of the compound represented by the above (30-1) to 38.86 g (97.0 mmol), the used amount of the compound represented by the above (30-2) to 0.333 g (0.97 mmol), the used amount of the compound represented by the above (40-8) to 14.03 g (2.19 mmol), and the used amount of lithium bromide to 29.44 g (340 mmol), the polymer represented by the (50-8) below was obtained in the same manner as Example 1. The result of the molecular weight measurement by GPC and the ion exchange capacity of the obtained polymer are shown in Table 1.

(50-8)

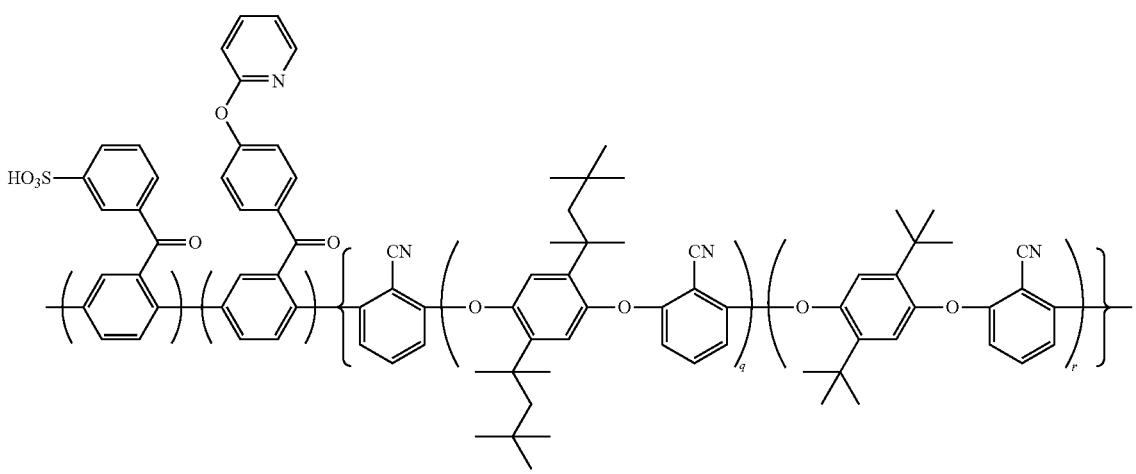

Example 9

Into a 1 L three-neck flask equipped with a stirrer, a thermometer, a Dean-Stark tube, a nitrogen-introducing tube and a cooling tube, 90.1 g (0.52 mol) of 2,6-dichlorobenzonitrile, 26.6 g (0.12 mol) of 2,5-di-tert-butylhydroquinone, 59.4 g (0.36 mol) of 2-tert-butylhydroquinone, and 85.6 g (0.62 mol) of potassium carbonate were weighed. After the flask was purged with nitrogen, 600 mL of sulfolane and 300 mL of toluene were added, and the mixture was stirred. In an oil bath, a reaction liquid was heated and refluxed at 150° C. Water generated by the reaction was trapped in the Dean-Stark tube. 3 hours thereafter, almost no water was recognized to be generated, at which time, toluene was removed through the Dean-Stark tube to the outside of the system. With the reaction temperature slowly increased from 180 to 190° C., the stirring was carried out for 3 hours, and then 24.6 g (0.14 mol) of 2,6-dichlorobenzonitrile was added. The reaction was further allowed to proceed for 5 hours.

After the reaction liquid was allowed to cool down, the reaction liquid was poured into 2401 mL of a methanol/4 wt % (volume ratio: 5/1) sulfuric acid solution for precipitation. A product precipitated was filtered, and the filtrate was stirred in 2401 mL of water at 55° C. for 1 hour. The resultant was filtered, and the filtrate was again stirred in 2401 mL of water at 55° C. for 1 hour. The resultant was filtered, and further the filtrate was stirred in 2401 mL of methanol at 55° C. for 1 hour. The resultant was filtered, and the filtrate was again stirred in 2401 mL of methanol at 55° C. for 1 hour. The resultant was filtered. The filtrate was dried in air, and vacuum dried at 80° C. As a result, 125 g of an intended product (yield percentage: 90%) was obtained.

Mn measured by GPC was 7,000. The compound obtained was identified to be an oligomer represented by the formula (40-9).

38.90 g (96.9 mmol) of the compound represented by the above (30-1), 0.334 g (0.97 mmol) of the compound represented by the above (30-2), 14.75 g (2.11 mmol) of the compound represented by the above (40-9), 1.96 g (3.0 mmol) of bis(triphenylphosphine)nickeldichloride, 2.36 g (9 mmol) of triphenylphosphine, and 11.77 g (180 mmol) of zinc were mixed. In the mixture, 172 mL of dried dimethylacetamide (DMAc) was added under nitrogen.

The reaction system was heated under stirring (heated eventually to 79° C.), and the reaction was made for 3 hours. During the reaction, the increase in viscosity in the system was observed. The polymerization reaction solution was diluted with 207 mL of DMAc, and the resultant was stirred for 30 minutes, and filtered using Celite as a filter aid.

Into the filtrate, 29.46 g (339 mmol) of lithium bromide was added, and the mixture was reacted, with the temperature of the mixture being 120° C., for 7 hours, under nitrogen atmosphere. After the reaction, the reaction liquid was cooled to room temperature, which was poured to 4.3 L of water for precipitation. A product precipitated was soaked in acetone, and the resultant was filtered. Then, the filtrate was washed. The washed product, while being stirred in 6500 g of 1N sulfuric acid, was washed. The product was filtered, and the filtrate was washed with ion exchange water until the pH of the washings became 5 or more. The result of the molecular weight measurement by GPC and the ion exchange capacity of the obtained polymer are shown in Table 1. It was found that the polymer obtained was represented by the following general formula (50-9).

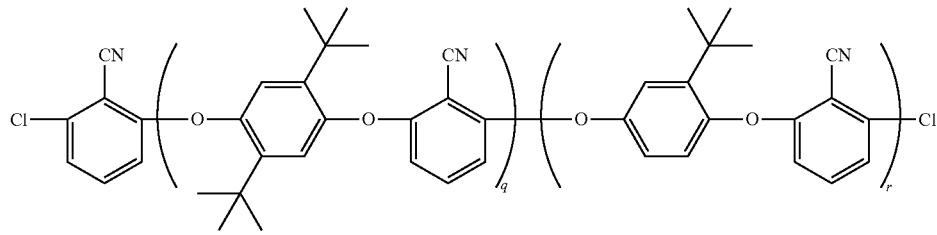

(40-9)

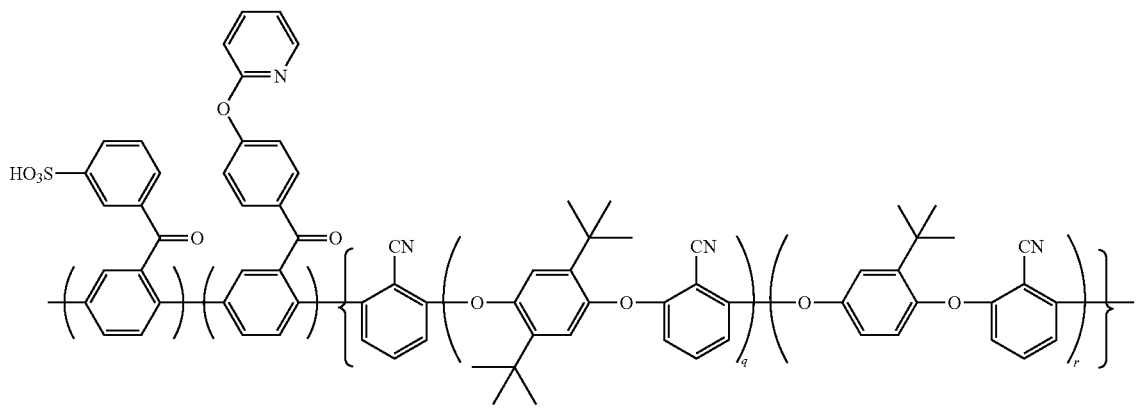

(50-9)

Example 10

Other than changing the used amount of the 26.6 g (0.12 mol) of 2,5-di-tert-butylhydroquinone to 10.63 g (0.048 mol), and changing the used amount of the 59.4 g (0.36 mol) of 2-tert-butylhydroquinone to 71.2 g (0.43 mol), the oligomer represented by the (40-10) below was obtained in the same manner as Example 9. Mn measured by GPC was 6,900.

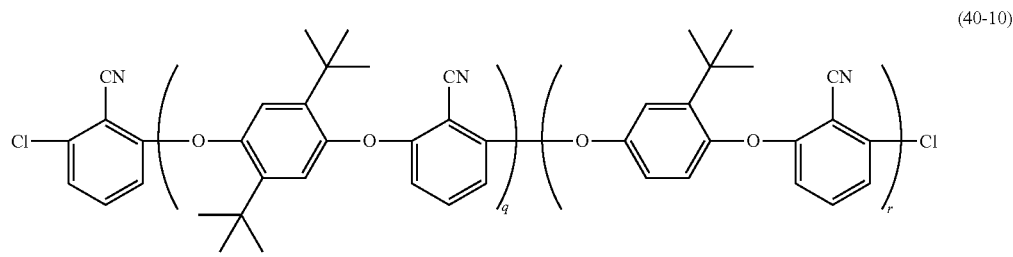

(40-10)

Additionally, other than changing the used amount of the compound represented by the above (30-1) to 38.88 g (97.0 mmol), the used amount of the compound represented by the above (30-2) to 0.334 g (0.97 mmol), the used amount of the compound represented by the above (40-10) to 14.75 g (2.14 mmol), and the used amount of lithium bromide to 29.45 g (339 mmol), the polymer represented by the (50-10) below was obtained in the same manner as Example 9. The result of the molecular weight measurement by GPC and the ion exchange capacity of the obtained polymer are shown in Table 1.

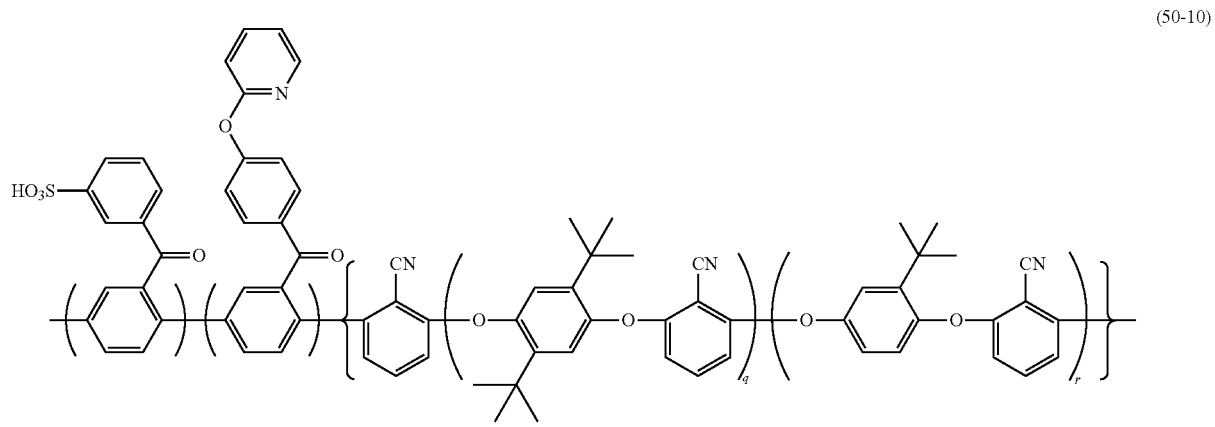

(50-10)

Example 11

Other than changing the 59.1 g (0.48 mol) of 2-methylhydroquinone to 50.3 g (0.41 mol) of 2-methylhydroquinone and 24.0 g (0.07 mol) of 2,2-bis(4-hydroxyphenyl)-1,1,1,3,3,3-hexafluoropropane, the oligomer represented by the (40-11) below was obtained in the same manner as Example 1. Mn measured by GPC was 6,700.

(40-11)

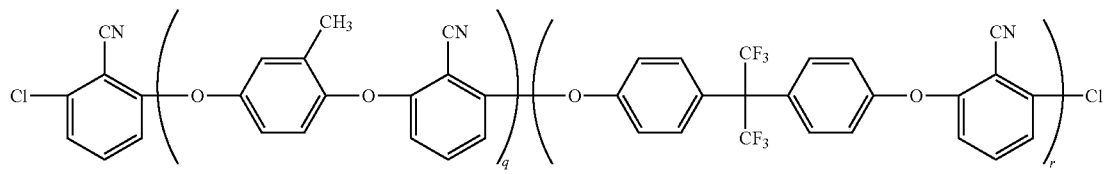

Additionally, other than changing the used amount of the compound represented by the above (30-1) to 38.90 g (97.0 mmol), the used amount of the compound represented by the above (30-2) to 0.334 g (0.97 mmol), the used amount of the compound represented by the above (40-11) to 14.04 g (2.10 mmol), and the used amount of lithium bromide to 29.47 g (340 mmol), the polymer represented by the (50-11) below was obtained in the same manner as Example 1. The result of the molecular weight measurement by GPC and the ion exchange capacity of the obtained polymer are shown in Table 1.

Additionally, other than changing the used amount of the compound represented by the above (30-1) to 19.46 g (48.5 mmol), the used amount of the compound represented by the above (30-2) to 0.167 g (0.49 mmol), the used amount of the compound represented by the above (40-12) to 7.33 g (1.03 mmol), the used amount of bis(triphenylphosphine)nickel-dichloride to 1.31 g (2.0 mmol), the used amount of triphenylphosphine to 1.57 g (6.0 mmol), the used amount of zinc to 7.84 g (120 mmol), and the used amount of lithium bromide to 14.74 g (170 mmol), the polymer represented by the (50-12) below was obtained in the same manner as Example 4. The result of the molecular weight measurement by GPC and the ion exchange capacity of the obtained polymer are shown in Table 1.

(50-11)

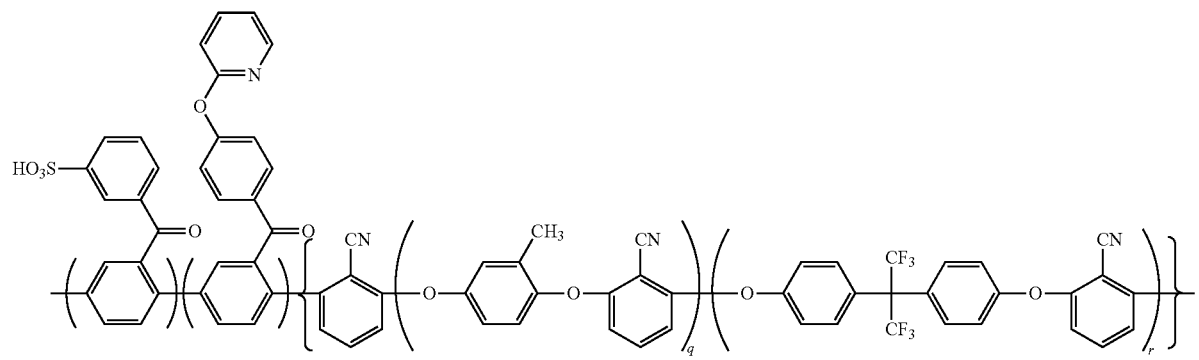

Example 12

Other than changing the reactants to 31.5 g (0.183 mol) of 2,6-dichlorobenzonitrile, 24.9 g (0.150 mol) of 2-tert-butylhydroquinone, 5.60 g (0.017 mol) of 2,2-bis(4-hydroxyphenyl)-1,1,1,3,3,3-hexafluoropropane, and 30.4 g (0.220 mol) of potassium carbonate, and other than changing the additive which was added during the reaction to 8.6 g (0.050 mol) of 2,6-dichlorobenzonitrile, the oligomer represented by the (40-12) below was obtained in the same manner as Example 4. Mn measured by GPC was 7,300.

(40-12)

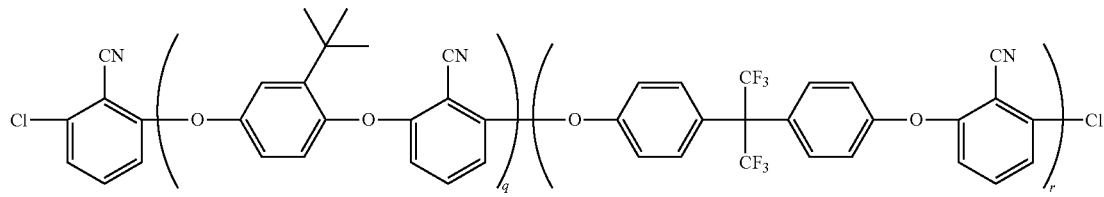

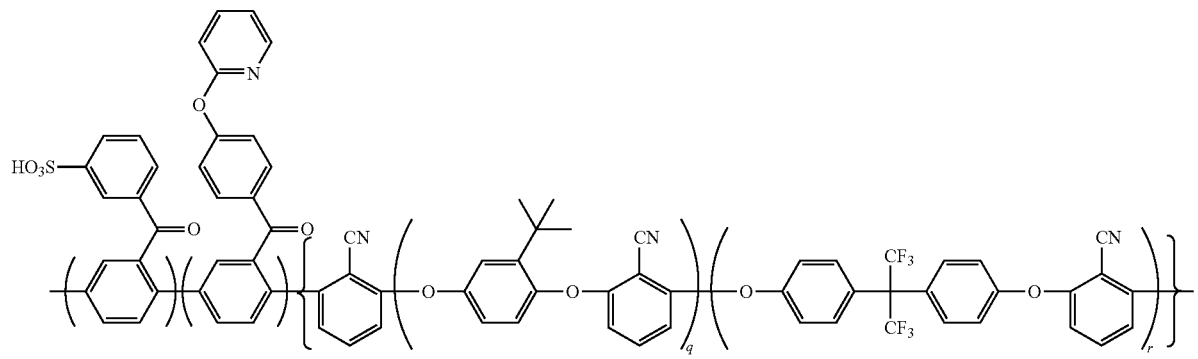

(50-12)

Example 13

Other than changing the reactants to 31.5 g (0.183 mol) of 2,6-dichlorobenzonitrile, 22.2 g (0.133 mol) of 2-tert-butyl-hydroquinone, 3.67 g (0.033 mol) of hydroquinone, and 30.4 g (0.220 mol) of potassium carbonate, and other than changing the additive which was added during the reaction to 8.6 g (0.050 mol) of 2,6-dichlorobenzonitrile, the oligomer represented by the (40-13) below was obtained in the same manner as Example 4.

Mn measured by GPC was 6,700.

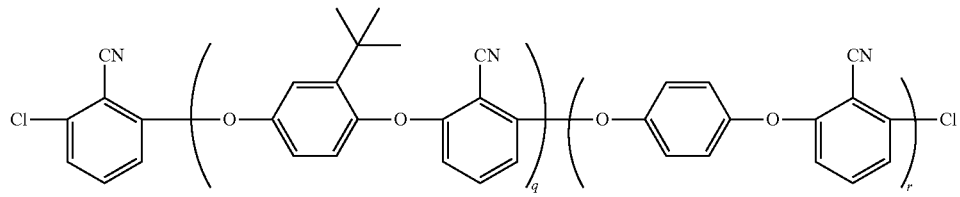

(40-13)

Additionally, other than changing the used amount of the compound represented by the above (30-1) to 19.46 g (48.5 mmol), the used amount of the compound represented by the above (30-2) to 0.167 g (0.49 mmol), the used amount of the compound represented by the above (40-13) to 7.38 g (1.02 mmol), the used amount of bis(triphenylphosphine)nickel-dichloride to 1.31 g (2.0 mmol), the used amount of triphenylphosphine to 1.57 g (6.0 mmol), the used amount of zinc to 7.84 g (120 mmol), and the used amount of lithium bromide to 14.74 g (170 mmol), the polymer represented by the (50-13) below was obtained in the same manner as Example 4. The result of the molecular weight measurement by GPC and the ion exchange capacity of the obtained polymer are shown in Table 1.

(50-13)

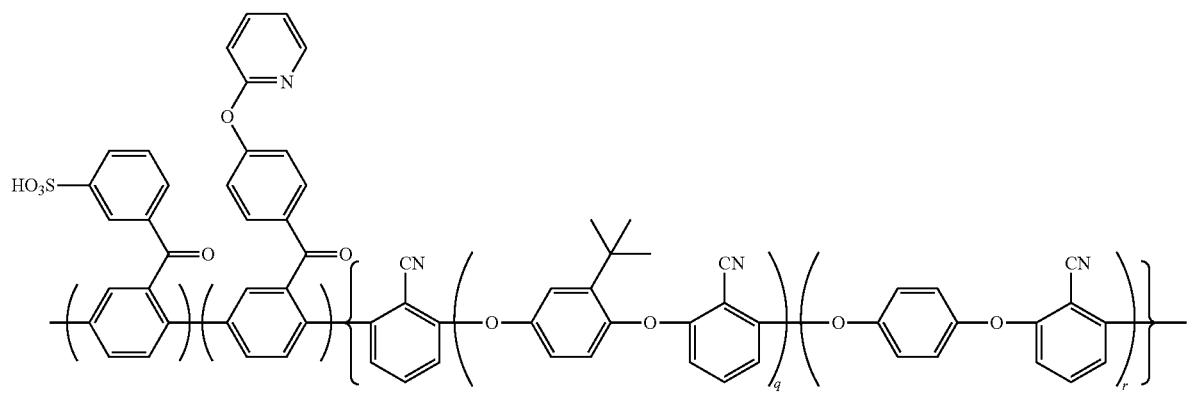

Example 14

Other than changing the reactants to 31.5 g (0.183 mol) of 2,6-dichlorobenzonitrile, 24.9 g (0.150 mol) of 2-tert-butylhydroquinone, 1.84 g (0.017 mol) of resorcinol, and 30.4 g (0.220 mol) of potassium carbonate, and other than changing the additive which was added during the reaction to 8.6 g (0.050 mol) of 2,6-dichlorobenzonitrile, the oligomer represented by the (40-14) below was obtained in the same manner as Example 4.

Mn measured by GPC was 6,200.

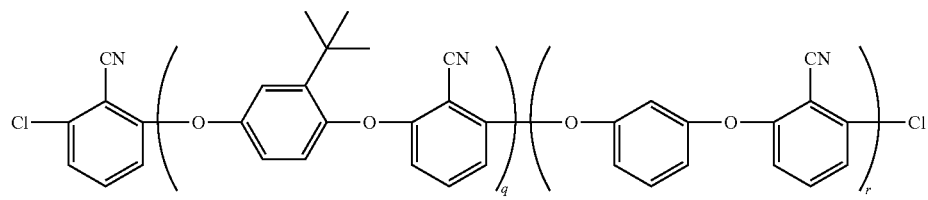

(40-14)

Additionally, other than changing the used amount of the compound represented by the above (30-1) to 19.40 g (48.3 mmol), the used amount of the compound represented by the above (30-2) to 0.166 g (0.48 mmol), the used amount of the compound represented by the above (40-14) to 7.32 g (1.18 mmol), the used amount of bis(triphenylphosphine)nickeldichloride to 1.31 g (2.0 mmol), the used amount of triphenylphosphine to 1.57 g (6.0 mmol), the used amount of zinc to 7.84 g (120 mmol), and the used amount of lithium bromide to 14.69 g (169 mmol), the polymer represented by the (50-14) below was obtained in the same manner as Example 4. The result of the molecular weight measurement by GPC and the ion exchange capacity of the obtained polymer are shown in Table 1.

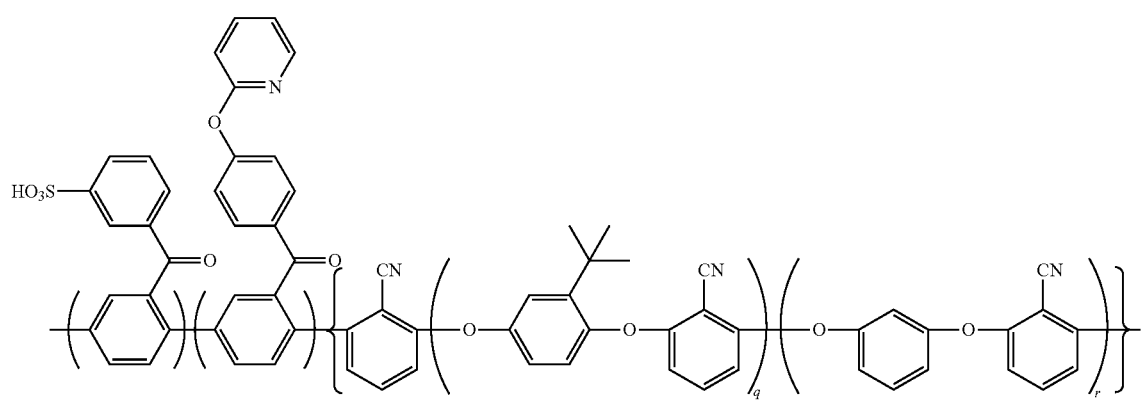

(50-14)

Example 15

Other than changing the used amount of the 26.6 g (0.12 mol) of 2,5-di-tert-butylhydroquinone to 26.6 g (0.12 mol), and changing the used amount of the 59.4 g (0.36 mol) of 2-tert-butylhydroquinone to 47.5 g (0.29 mol), the oligomer represented by the (40-15) below was obtained in the same manner as Example 9. Mn measured by GPC was 7,200.

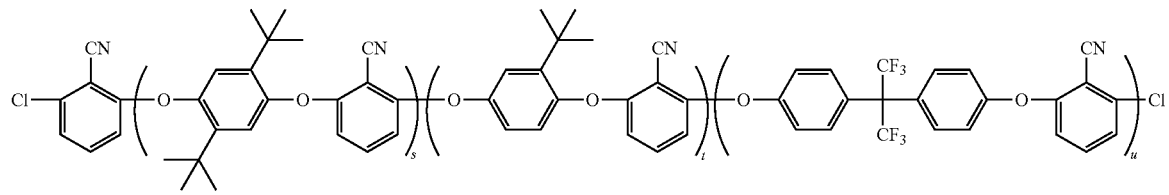

(40-15)

Additionally, other than changing the used amount of the compound represented by the above (30-1) to 38.92 g (97.0 mmol), the used amount of the compound represented by the above (30-2) to 0.334 g (0.97 mmol), the used amount of the compound represented by the above (40-15) to 14.76 g (2.05 mmol), and the used amount of lithium bromide to 29.48 g (339 mmol), the polymer represented by the (50-15) below was obtained in the same manner as Example 9. The result of the molecular weight measurement by GPC and the ion exchange capacity of the obtained polymer are shown in Table 1.

changing the used amount of the 24.0 g (0.07 mol) of 2,2-bis (4-hydroxyphenyl)-1,1,1,3,3,3-hexafluoropropane to 144.1 g (0.43 mol), the oligomer represented by the (40-16) below was obtained in the same manner as Example 12. Mn measured by GPC was 7,200. Additionally, other than changing the used amount of the compound represented by the above (30-1) to 38.96 g (97.0 mmol), the used amount of the compound represented by the above (30-2) to 0.334 g (0.97 mmol), the used amount of the compound represented by the above (40-16) to 14.05 g (1.95 mmol), and the used amount of lithium bromide to 29.51 g (340 mmol), the polymer represented by the (50-16) below was obtained in the same manner as Example 9. The result of the molecular weight measurement by GPC and the ion exchange capacity of the obtained polymer are shown in Table 1.

(50-15)

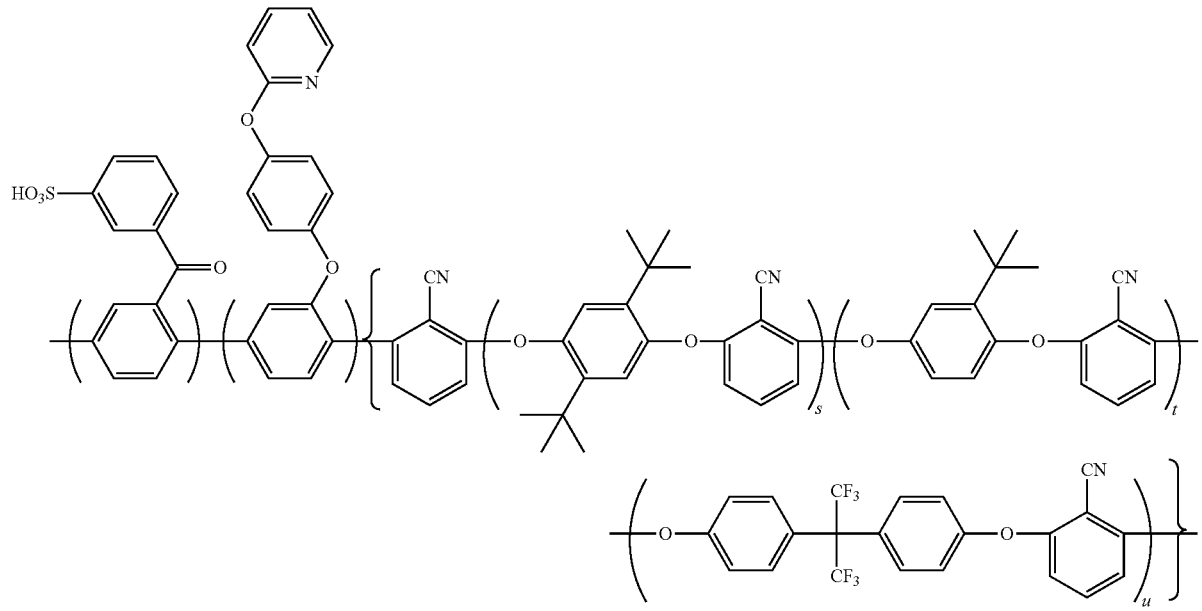

Example 16

Other than changing the used amount of the 59.1 g (0.48 mol) of 2-tert-butylhydroquinone to 10.6 g (0.048 mol), and (40-16)

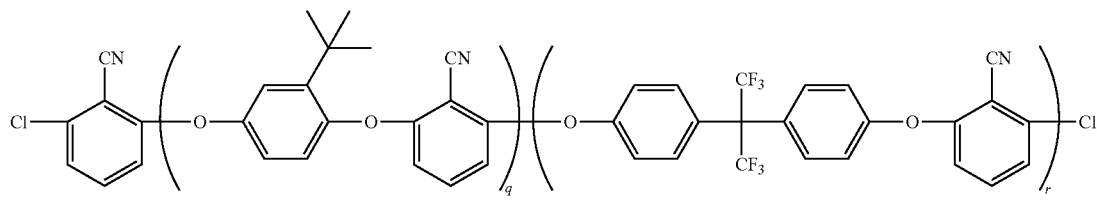

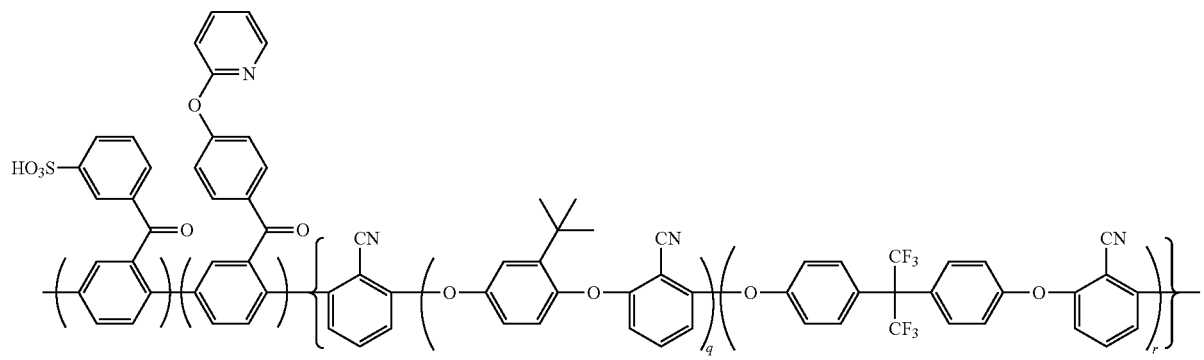

(50-16)

Comparative Example 1

Into a 1 L three-neck flask equipped with a stirrer, a thermometer, a Dean-Stark tube, a nitrogen-introducing tube and a cooling tube, 154.8 g (0.9 mol) of 2,6-dichlorobenzonitrile, 269.0 g (0.8 mol) of 2,2-bis(4-hydroxyphenyl)-1,1,1,3,3,3-hexafluoropropane, and 143.7 g (1.04 mol) of potassium carbonate were weighed and introduced. After the flask was purged with nitrogen, 1020 mL of sulfolane and 510 mL of toluene were added, and the mixture was stirred.

In an oil bath, a reaction liquid was heated and refluxed at 150° C. Water generated by the reaction was trapped in the Dean-Stark tube. 3 hours thereafter, almost no water was recognized to be generated, at which time, toluene was removed through the Dean-Stark tube to the outside of the system. With the reaction temperature slowly increased to 200° C., the stirring was carried out for 3 hours, and then 51.6 g (0.3 mol) of 2,6-dichlorobenzonitrile was added. The reaction was further allowed to proceed for 5 hours.

After the reaction liquid was allowed to cool down, 250 mL of toluene was added in order to dilute the reaction liquid. Inorganic salts insoluble in the reaction liquid was filtered off, and the filtrate was poured into 8 L of methanol in order to precipitate a product. The product precipitated was filtered, and the filtrate was dried, and the dried product was dissolved in 500 mL of tetrahydrofuran. This solution was poured into 5 L of methanol for precipitation. A white solid precipitated was filtered, and the filtrate was dried, to thereby obtain 258 g of an intended product. Mn measured by GPC was 8,200. The compound obtained was identified to be an oligomer represented by the formula (60-1).

(60-1)

39.05 g (97.3 mmol) of the compound represented by the above (30-1), 0.335 g (0.97 mmol) of the compound represented by the above (30-2), 14.06 g (1.72 mmol) of the compound represented by the above (60-1), 1.96 g (3.0 mmol) of bis(triphenylphosphine)nickeldichloride, 2.36 g (9 mmol) of triphenylphosphine, and 11.77 g (180 mmol) of zinc were mixed, and into the mixture, 160 mL of dried dimethylacetamide (DMAc) was added under nitrogen.

The reaction system was heated under stirring (heated eventually to 79° C.), and the reaction was made for 3 hours. During the reaction, the increase in viscosity in the system was observed. The polymerization reaction solution was diluted with 373 mL of DMAc, and the resultant was stirred for 30 minutes, and filtered using Celite as a filter aid.

Into the filtrate, 29.58 g (340 mmol) of lithium bromide was added, and the mixture was reacted, with the temperature of the mixture being 120° C., for 7 hours, under nitrogen atmosphere. After the reaction, the reaction liquid was cooled to room temperature, which was poured to 4.1 L of water for precipitation. A product precipitated was soaked in acetone, and the resultant was filtered. Then, the filtrate was washed. The washed product, while being stirred in 6500 g of 1N sulfuric acid, was washed. The product was filtered, and the filtrate was washed with ion exchange water until the pH of the washings became 5 or more. The result of the molecular weight measurement by GPC and the ion exchange capacity of the obtained polymer are shown in Table 1. It was found that the polymer obtained was represented by the following general formula (70-1).

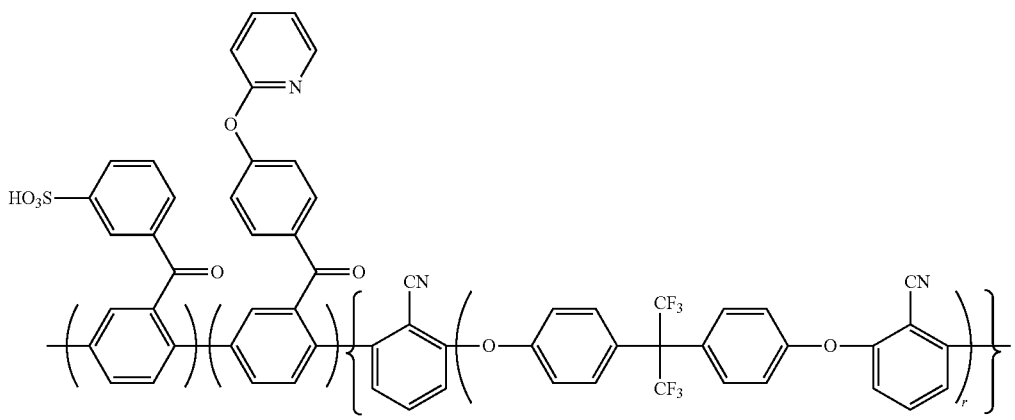

(70-1)

TABLE 1

| | Monomer components used in structural unit having no sulfonic acid group | | | Molar ratio of monomer components | Polymer molecular weight | | Ion exchange capacity | Hot water experiment 120° C. × 24 h | Proton conductivity 85° C. × 90% RH |
|---|---|---|---|---|---|---|---|---|---|
| | (1) | (2) | (3) | (1)/(2)/(3) | Mw | Mn | meq/g | Swelling/Shrinkage | S/cm |
| Example 1 | Me-HQ | | | 100/0/0 | 205000 | 70000 | 2.35 | 14 | 0.28 |
| Example 2 | di-Me-HQ | | | 100/0/0 | 195000 | 67000 | 2.32 | 16 | 0.29 |
| Example 3 | Me-HQ | di-Me-HQ | | 75/25/0 | 198000 | 67000 | 2.34 | 12 | 0.32 |
| Example 4 | tert-BuHQ | | | 100/0/0 | 192000 | 54500 | 2.29 | 16 | 0.26 |
| Example 5 | tert-BuHQ | | | 100/0/0 | 221000 | 65600 | 2.31 | 10 | 0.28 |
| Example 6 | tetra-MeBuHQ | | | 100/0/0 | 220000 | 75000 | 2.33 | 16 | 0.30 |
| Example 7 | tert-AmylHQ | | | 100/0/0 | 216000 | 72000 | 2.32 | 13 | 0.31 |
| Example 8 | tetra-MeBuHQ | di-tert-BuHQ | | 25/75/0 | 202000 | 69100 | 2.31 | 15 | 0.29 |
| Example 9 | tert-BuHQ | di-tert-BuHQ | | 75/25/0 | 204000 | 65400 | 2.29 | 10 | 0.27 |
| Example 10 | tert-BuHQ | di-tert-BuHQ | | 90/10/0 | 210000 | 72000 | 2.31 | 13 | 0.30 |
| Example 11 | Me-HQ | | Bis-AF | 85/0/15 | 230000 | 78000 | 2.31 | 18 | 0.29 |
| Example 12 | tert-BuHQ | | Bis-AF | 90/0/10 | 167000 | 54000 | 2.29 | 15 | 0.30 |
| Example 13 | tert-BuHQ | | HQ | 80/0/20 | 260000 | 75600 | 2.31 | 11 | 0.29 |
| Example 14 | tert-BuHQ | | Res | 90/0/10 | 136000 | 46500 | 2.33 | 15 | 0.29 |
| Example 15 | tert-BuHQ | di-tert-BuHQ | Bis-AF | 60/25/15 | 210000 | 68600 | 2.30 | 14 | 0.30 |
| Example 16 | tert-BuHQ | | Bis-AF | 10/0/90 | 206000 | 70000 | 2.29 | 19 | 0.30 |
| Comparative Example 1 | Absent | Absent | Bis-AF | 0/0/100 | 211000 | 71700 | 2.33 | 23 | 0.31 |

Me-HQ 2-methylhydroquinone
di-Me-HQ 2,3-dimethylhydroquinone
tert-BuHQ 2-tert-butylhydroquinone
tetra-MeBuHQ 2,5-di-1,1,3,3-tetramethylbutyl hydroquinone
tert-AmylHQ 2,5-di-tert-amylhydroquinone
di-tert-BuHQ 2,5-di-tert-butylhydroquinone
Bis-AF 2,2-bis(4-hydroxyphenyl)-1,1,1-3,3,3-hexafluoropropane
HQ hydroquinone
Res resorcinol As shown in Table 1, it was found that by using the specific structure having no sulfonic group, swelling in hot water and shrinkage in drying can be suppressed.

The invention claimed is:
1. A polyarylene block copolymer comprising a polymer segment (A) comprising a sulfonic acid group, and a polymer segment (B) comprising substantially no sulfonic acid group, wherein the polymer segment (B) comprises a structural unit represented by formula (1):

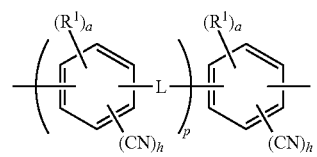

(1)

wherein:
each $R^1$ is independently a halogen atom, a hydrocarbon group comprising 1 to 20 carbon atoms, or a halogenated hydrocarbon group comprising 1 to 20 carbon atoms;
each a is an integer of from 0 to 3;
p is an integer of from 2 to 200;
each h is an integer of from 1 to "4-a";
L is a structural unit of formula (1-1):

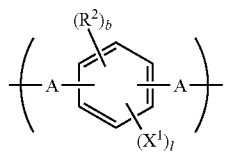

(1-1)

and a plurality of $R^1$, a, and L may be the same or different; and wherein:
each A is independently —O— or —S—;
each $R^2$ is independently a hydrocarbon group comprising 1 to 20 carbon atoms, or a halogenated hydrocarbon group comprising 1 to 20 carbon atoms;
each $X^1$ is independently a halogen atom;
b is an integer of from 1 to 4;
l is an integer of from 0 to 3;
b+l is not greater than 4; or
L is a structural unit of formula (1-2):

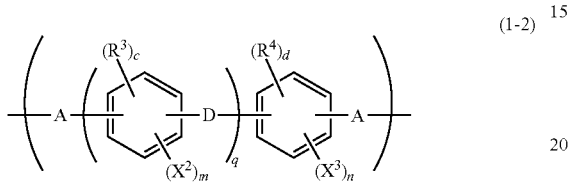

(1-2)

wherein:
each A is independently —O— or —S—;
D is at least one structure selected from the group consisting of a direct bond, —O—, —S—, —CO—, —SO$_2$—, —SO—, —CONH—, —COO—, —(CF$_2$)$_i$—, wherein i is an integer of from 1 to 10, —(CH$_2$)$_j$—, wherein j is an integer of from 1 to 10, —CR'$_2$—, wherein R' is an aliphatic hydrocarbon group, an aromatic hydrocarbon group, or a halogenated hydrocarbon group, a cyclohexylidene group, and a fluorenylidene group;
each $R^3$ and $R^4$ is independently a hydrocarbon group comprising 1 to 20 carbon atoms, or a halogenated hydrocarbon group comprising 1 to 20 carbon atoms;
each $X^2$ and $X^3$ is independently a halogen atom;
each c and d is independently an integer of from 0 to 4;
each m and n is independently an integer of from 0 to 4; and
q is an integer of from 0 to 4;
wherein:
when q=0, d is 0; and
c+m and d+n are not greater than 4; and
wherein
at least one of a plurality of L is a structural unit of formula (1-1).

2. The polyarylene block copolymer according to claim 1, wherein the number average molecular weight in terms of polystyrene of a precursor for deriving the polymer segment (B) comprising no sulfonic acid group, is from 1,000 to 50,000,
wherein the precursor comprises a structural unit of formula (1'):

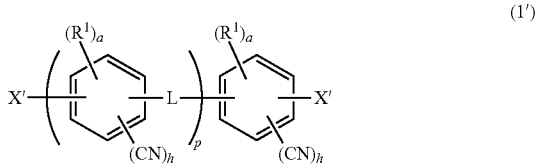

(1')

wherein, $R^1$, L, a, p and h are defined in the same way as in the formula (1); and each X' is independently an atom or a group selected from a halogen atom, a nitro group, —SO$_2$CH$_3$, and —SO$_2$CF$_3$.

3. The polyarylene block copolymer according to claim 1, wherein, in the formula (1), p is of from 2 to 150.

4. The polyarylene block copolymer according to claim 1, wherein the copolymer comprises the structural unit represented by the formula (1-1) and comprises the structural unit represented by the formula (1-2) in a molar ratio (1-1:1-2) of 100:0 to 50:50.

5. The polyarylene block copolymer according to claim 1, wherein:
the structural unit represented by the formula (1-1) comprises
a structural unit represented by formula (1-3):

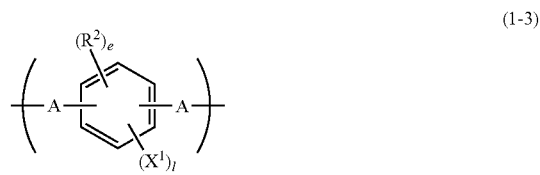

(1-3)

wherein:
$R^2$, A, $X^1$, and l are defined in the same way as in the formula (1-1); and
e is an integer of 1 or 3; and
a structural unit represented by formula (1-4):

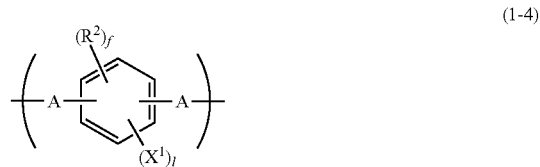

(1-4)

wherein:
$R^2$, A, $X^1$, and l are defined in the same way as in the formula (1-1); and
f is an integer of 2 or 4.

6. The polyarylene block copolymer according to claim 1, wherein the polymer segment (A) comprises a structural unit represented by formula (3);

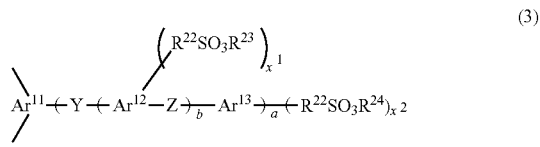

(3)

wherein:
each $Ar^{11}$, $Ar^{12}$, and $Ar^{13}$ is independently a divalent group comprising at least one structure selected from the group consisting of a benzene ring, a condensed aromatic ring, and a nitrogen-containing heterocyclic ring each of which may be substituted with a fluorine atom;
Y is —CO—, —SO$_2$—, —SO—, —CONH—, —COO—, —(CF$_2$)$_u$—, wherein u is an integer of from 1 to 10, —C(CF$_3$)$_2$—, or a direct bond;
Z is —O—, —S—, a direct bond, —CO—, —SO$_2$—, —SO—, —(CH$_2$)$_l$—, wherein l is an integer of from 1 to 10, or —C(CH$_3$)$_2$—;

each $R^{22}$ is indepedently a direct bond, $-O(CH_2)_p-$, $-O(CF_2)_p-$, $-(CH_2)_p-$, or $-(CF_2)_p-$, wherein p is an integer of from 1 to 12;

each $R^{23}$ and $R^{24}$ is independently a hydrogen atom, an alkali metal atom, an aliphatic hydrocarbon group, an alicyclic group, or an oxygen-containing heterocyclic group, wherein:
$R^{23}$ in formula (3) is a hydrogen atom, $R^{24}$ in formula (3) is a hydrogen atom, or both $R^{23}$ and $R^{24}$ in formula (3) are hydrogen atoms;

$x^1$ is an integer of from 0 to 4;

$x^2$ is an integer of from 0 to 5;

a is an integer of from 0 to 1; and each b is an integer of from 0 to 3.

7. A polymer electrolyte comprising the polyarylene block copolymer of claim 1.

8. A proton conductive membrane comprising the polyarylene block copolymer of claim 1.

9. A membrane electrolyte assembly comprising a membrane comprising the polymer electrolyte of claim 7.

10. A fuel cell comprising the proton conductive membrane of claim 8.

* * * * *